United States Patent
Mizuguchi

(10) Patent No.: US 9,244,447 B2
(45) Date of Patent: Jan. 26, 2016

(54) SUBSTRATE PROCESSING APPARATUS, SUBSTRATE PROCESSING METHOD, NON-TRANSITORY COMPUTER-READABLE RECORDING MEDIUM, AND SUBSTRATE TRANSFER METHOD

(71) Applicant: HITACHI KOKUSAI ELECTRIC INC., Tokyo (JP)

(72) Inventor: Yasuhiro Mizuguchi, Toyama (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 364 days.

(21) Appl. No.: 13/729,432

(22) Filed: Dec. 28, 2012

(65) Prior Publication Data
US 2013/0178954 A1 Jul. 11, 2013

(30) Foreign Application Priority Data
Jan. 5, 2012 (JP) .................................. 2012-000771

(51) Int. Cl.
G05B 15/02 (2006.01)
G05B 23/02 (2006.01)

(52) U.S. Cl.
CPC ............ G05B 15/02 (2013.01); G05B 23/0289 (2013.01)

(58) Field of Classification Search
None
See application file for complete search history.

(56) References Cited

U.S. PATENT DOCUMENTS

| 2006/0030966 A1* | 2/2006 | Huang et al. ................... 700/121 |
| 2008/0125898 A1* | 5/2008 | Harvey et al. ................. 700/110 |
| 2009/0076648 A1* | 3/2009 | Numakura et al. ........... 700/228 |
| 2010/0203242 A1* | 8/2010 | Borden ...................... 427/248.1 |

FOREIGN PATENT DOCUMENTS

| JP | A-2001-250780 | 9/2001 |
| JP | 2005322762 A | 11/2005 |
| JP | A-2006-339662 | 12/2006 |
| JP | B2-4294972 | 7/2009 |

OTHER PUBLICATIONS

Mar. 11, 2014 Office Action issued in South Korean Application No. 10-2013-0163918 (with translation).
Jun. 23, 2015 Office Action issued in Japanese Patent application No. 2012-000771.

* cited by examiner

Primary Examiner — Kenneth M Lo
Assistant Examiner — Geoffrey Wellman
(74) Attorney, Agent, or Firm — Oliff PLC

(57) ABSTRACT

To provide a substrate processing apparatus, including a control unit that performs control to transfer a prescribed substrate into each chamber, wherein when error is detected during transfer of the substrate, the control unit performs control to: specify a place where the error is generated; select a fallback operation table according to a processing status of the substrate, which is the table defining a processing content for each part of the substrate processing apparatus including the place where the error is generated; and transfer the substrate based on the selected fallback operation table.

11 Claims, 23 Drawing Sheets

FIG.4

| PROCESSING ID | PJOBID × × × × × | | |
|---|---|---|---|
| TOTAL NUMBER OF SUBSTRATE | 4 | | |
| PROCESSING RECIPE NAME | RECIPE A | | |
| PROCESSED SUBSTRATE | TYPE OF SUBSTRATE | TRANSFER SOURCE | PROCESSING STATUS |
| No. 1 | PRODUCT | LP1 Slot1 | UNPROCESSED |
| No. 2 | PRODUCT | LP1 Slot2 | UNPROCESSED |
| No. 3 | PRODUCT | LP1 Slot3 | UNPROCESSED |
| No. 4 | PRODUCT | LP1 Slot4 | UNPROCESSED |

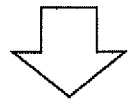

| PROCESSING ID | PJOBID × × × × × | | |
|---|---|---|---|
| TOTAL NUMBER OF SUBSTRATE | 5 | | |
| PROCESSING RECIPE NAME | RECIPE A | | |
| PROCESSED SUBSTRATE | TYPE OF SUBSTRATE | TRANSFER SOURCE | PROCESSING STATUS |
| No. 1 | PRODUCT | LP1 Slot 1 | UNPROCESSED |
| No. 2 | PRODUCT | LP1 Slot 2 | UNPROCESSED |
| No. 3 | PRODUCT | LP1 Slot 3 | UNPROCESSED |
| No. 4 | PRODUCT | LP1 Slot 4 | UNPROCESSED |
| No. 5 | DUMMY | LP3 Slot 1 | UNPROCESSED |

FIG.6

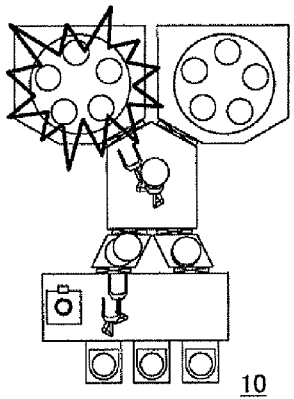

ERROR GENERATION PLACE OF ANY ONE OF PROCESS CHAMBERS

| EACH PART OF SUBSTRATE PROCESSING APPARATUS | SUBSTRATE ATTRIBUTE | PROCESSING CONTENT |
|---|---|---|
| ERROR PM | – | SUBSTRATE STAYS IN PM |
| NORMAL PM | UNPROCESSED | PROCESSING IS CONTINUED (USING FILLER DUMMY SUBSTRATE AS NEEDED) |
| | UNDER PROCESS | SUBSTRATE STANDS-BY FOR NORMAL END AND IS RETURNED TO CA |
| | PROCESSED | SUBSTRATE IS RETURNED TO CA |
| TM | UNPROCESSED | TRANSFER IS CONTINUED |
| | PROCESSED | TRANSFER IS CONTINUED |
| LM | UNPROCESSED | TRANSFER IS CONTINUED |
| | PROCESSED | TRANSFER IS CONTINUED |
| EFEM | UNPROCESSED | TRANSFER IS CONTINUED |
| | PROCESSED | TRANSFER IS CONTINUED |
| OFA | UNPROCESSED | TRANSFER IS CONTINUED |

FIG.7

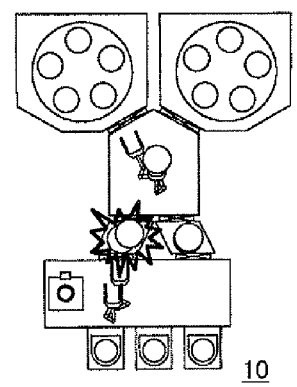

ERROR GENERATION PLACE OF ANY ONE OF LOAD LOCK CHAMBERS

| EACH PART OF SUBSTRATE PROCESSING APPARATUS | SUBSTRATE ATTRIBUTE | PROCESSING CONTENT |
|---|---|---|
| PM | UNPROCESSED | PROCESSING IS CONTINUED (USING FILLER DUMMY SUBSTRATE AS NEEDED) |
| | UNDER PROCESS | SUBSTRATE STANDS-BY FOR NORMAL END AND IS RETURNED TO CA |
| | PROCESSED | SUBSTRATE IS RETURNED TO CA |
| TM | UNPROCESSED | TRANSFER IS CONTINUED |
| | PROCESSED | TRANSFER IS CONTINUED |
| ERROR LM | – | SUBSTRATE STAYS IN LM |
| NORMAL LM | UNPROCESSED | TRANSFER IS CONTINUED |
| | PROCESSED | TRANSFER IS CONTINUED |
| EFEM | UNPROCESSED | TRANSFER IS CONTINUED |
| | PROCESSED | TRANSFER IS CONTINUED |
| OFA | UNPROCESSED | TRANSFER IS CONTINUED |

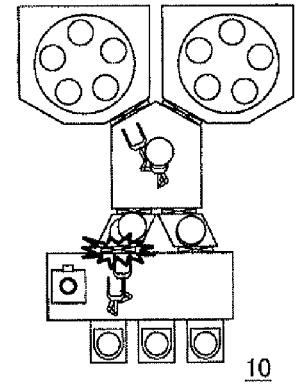

ERROR GENERATION PLACE IS ANY ONE OF GATE VALVES AT ATMOSPHERE TRANSFER CHAMBER SIDE

| EACH PART OF SUBSTRATE PROCESSING APPARATUS | SUBSTRATE ATTRIBUTE | PROCESSING CONTENT |
|---|---|---|
| PM | UNPROCESSED | PROCESSING IS CONTINUED (USING FILLER DUMMY SUBSTRATE AS NEEDED) |
| | UNDER PROCESS | SUBSTRATE STANDS-BY FOR NORMAL END AND IS RETURNED TO CA |
| | PROCESSED | SUBSTRATE IS RETURNED TO CA |
| TM | UNPROCESSED | TRANSFER IS CONTINUED |
| | PROCESSED | TRANSFER IS CONTINUED |
| ERROR LM (ERROR IS GENERATED IN LGA) | – | SUBSTRATE STAYS IN LM |
| NORMAL LM | UNPROCESSED | TRANSFER IS CONTINUED |
| | PROCESSED | TRANSFER IS CONTINUED |
| EFEM | UNPROCESSED | TRANSFER IS CONTINUED |
| | PROCESSED | TRANSFER IS CONTINUED |
| OFA | UNPROCESSED | TRANSFER IS CONTINUED |

FIG.8

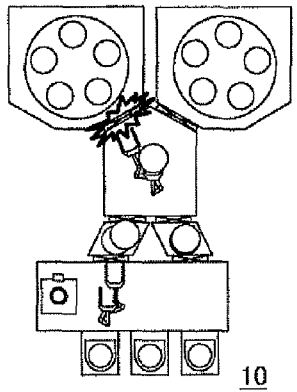

ERROR GENERATION PLACE IS ANY ONE OF GATE VALVES OF PROCESS CHAMBER

| EACH PART OF SUBSTRATE PROCESSING APPARATUS | SUBSTRATE ATTRIBUTE | PROCESSING CONTENT |
|---|---|---|
| ERROR SIDE PM (ERROR IS GENERATED IN PGV) | UNPROCESSED | SUBSTRATE STAYS IN PM |
| | UNDER PROCESS | SUBSTRATE STANDS-BY FOR NORMAL END AND STAYS IN PM |
| | PROCESSED | SUBSTRATE STAYS IN PM |
| NORMAL SIDE PM | UNPROCESSED | SUBSTRATE STAYS IN PM |
| | UNDER PROCESS | SUBSTRATE STANDS-BY FOR NORMAL END AND STAYS IN PM |
| | PROCESSED | SUBSTRATE STAYS IN PM |
| TM | UNPROCESSED | SUBSTRATE STAYS IN TM |
| | PROCESSED | SUBSTRATE STAYS IN TM |
| LM | UNPROCESSED | SUBSTRATE IS WITHDRAWN INTO CA |
| | PROCESSED | SUBSTRATE IS WITHDRAWN INTO CA |
| EFEM | UNPROCESSED | SUBSTRATE IS WITHDRAWN INTO CA |
| | PROCESSED | SUBSTRATE IS WITHDRAWN INTO CA |
| OFA | UNPROCESSED | SUBSTRATE IS WITHDRAWN INTO CA |

FIG.9

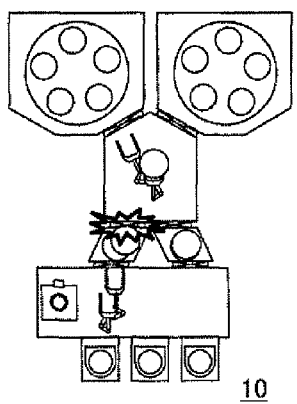

ERROR GENERATION PLACE IS ANY ONE OF GATE VALVES AT VACUUM TRANSFER CHAMBER SIDE

| EACH PART OF SUBSTRATE PROCESSING APPARATUS | SUBSTRATE ATTRIBUTE | PROCESSING CONTENT |
|---|---|---|
| PM | UNPROCESSED | SUBSTRATE STAYS IN PM |
| | UNDER PROCESS | SUBSTRATE STANDS-BY FOR NORMAL END AND STAYS IN PM |
| | PROCESSED | SUBSTRATE STAYS IN PM |
| TM | UNPROCESSED | SUBSTRATE STAYS IN TM |
| | PROCESSED | SUBSTRATE STAYS IN TM |
| ERROR SIDE LM (ERROR IS GENERATED IN LGV) | - | SUBSTRATE STAYS IN LM |
| NORMAL SIDE LM | UNPROCESSED | SUBSTRATE IS WITHDRAWN INTO CA |
| | PROCESSED | SUBSTRATE IS WITHDRAWN INTO CA |
| EFEM | UNPROCESSED | SUBSTRATE IS WITHDRAWN INTO CA |
| | PROCESSED | SUBSTRATE IS WITHDRAWN INTO CA |
| OFA | UNPROCESSED | SUBSTRATE IS WITHDRAWN INTO CA |

FIG.11

| PROCESSING ID | PJOBID × × × × × | | |
|---|---|---|---|
| TOTAL NUMBER OF SUBSTRATE | 5 | | |
| PROCESSING RECIPE NAME | RECIPE A | | |
| PROCESSED SUBSTRATE | TYPE OF SUBSTRATE | TRANSFER SOURCE | PROCESSING STATUS |
| ~~No. 1~~ | PRODUCT | LP1 Slot 1 | UNPROCESSED |
| No. 2 | PRODUCT | LP1 Slot 2 | UNPROCESSED |
| ~~No. 3~~ | PRODUCT | LP1 Slot 3 | UNPROCESSED |
| No. 4 | PRODUCT | LP1 Slot 4 | UNPROCESSED |
| No. 5 | DUMMY | LP3 Slot 1 | UNPROCESSED |

⬇

| PROCESSING ID | PJOBID × × × × × | | |
|---|---|---|---|
| TOTAL NUMBER OF SUBSTRATE | 5 | | |
| PROCESSING RECIPE NAME | RECIPE A | | |
| PROCESSED SUBSTRATE | TYPE OF SUBSTRATE | TRANSFER SOURCE | PROCESSING STATUS |
| No. 4 | PRODUCT | LP1 Slot 4 | UNPROCESSED |
| No. 5 | DUMMY | LP3 Slot 1 | UNPROCESSED |
| No. 6 | DUMMY | LP3 Slot 2 | UNPROCESSED |
| No. 7 | DUMMY | LP3 Slot 3 | UNPROCESSED |
| No. 8 | DUMMY | LP3 Slot 4 | UNPROCESSED |

FIG.16

○ PRODUCT SUBSTRATE FORWARD PLACING
○ PRODUCT SUBSTRATE BACKWARD PLACING
● ARBITRARY INDICATION

| SUBSTRATE PLACING PIECE No. | (1) DUMMY FIXTURE | (2) DUMMY PRIORITY No. |
|---|---|---|
| ST11 | ✓ | |
| ST12 | ☐ | DUMMY PRIORITY No.2 |
| ST13 | ✓ | |
| ST14 | ☐ | DUMMY PRIORITY No.3 |
| ST15 | ☐ | DUMMY PRIORITY No.1 |

PM1 PARAMETER FOR DUMMY SUBSTRATE

○ PRODUCT SUBSTRATE FORWARD PLACING
● PRODUCT SUBSTRATE BACKWARD PLACING
○ ARBITRARY INDICATION

| SUBSTRATE PLACING PIECE No. | (1) DUMMY FIXTURE | (2) DUMMY PRIORITY No. |
|---|---|---|
| ST21 | ☐ | DUMMY PRIORITY No.3 |
| ST22 | ☐ | DUMMY PRIORITY No.2 |
| ST23 | ☐ | DUMMY PRIORITY No.1 |
| ST24 | ✓ | |
| ST25 | ✓ | |

PM2 PARAMETER FOR DUMMY SUBSTRATE

FIG.21

| PROCESSING ID | PJOBID × × × × × | | |
|---|---|---|---|
| TOTAL NUMBER OF SUBSTRATE | 5 | | |
| PROCESSING RECIPE NAME | RECIPE A | | |
| PROCESSED SUBSTRATE | TYPE OF SUBSTRATE | TRANSFER SOURCE | PROCESSING STATUS |
| No. 1 | PRODUCT | LP1 Slot 1 | UNPROCESSED |
| No. 2 | PRODUCT | LP1 Slot 2 | UNPROCESSED |
| No. 3 | PRODUCT | LP1 Slot 3 | UNPROCESSED |
| No. 4 | PRODUCT | LP1 Slot 4 | UNPROCESSED |
| No. 5 | PRODUCT | LP1 Slot 5 | UNPROCESSED |

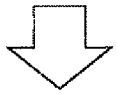

| PROCESSING ID | PJOBID × × × × × | | |
|---|---|---|---|
| TOTAL NUMBER OF SUBSTRATE | 10 | | |
| PROCESSING RECIPE NAME | RECIPE A | | |
| PROCESSED SUBSTRATE | TYPE OF SUBSTRATE | TRANSFER SOURCE | PROCESSING STATUS |
| No. 1 | PRODUCT | LP1 Slot 1 | UNPROCESSED |
| No. 2 | PRODUCT | LP1 Slot 2 | UNPROCESSED |
| No. 3 | DUMMY | LP3 Slot 1 | UNPROCESSED |
| No. 4 | PRODUCT | LP1 Slot 3 | UNPROCESSED |
| No. 5 | PRODUCT | LP1 Slot 4 | UNPROCESSED |
| No. 6 | PRODUCT | LP1 Slot 5 | UNPROCESSED |
| No. 7 | DUMMY | LP3 Slot 2 | UNPROCESSED |
| No. 8 | DUMMY | LP3 Slot 3 | UNPROCESSED |
| No. 9 | DUMMY | LP3 Slot 4 | UNPROCESSED |
| No.10 | DUMMY | LP3 Slot 5 | UNPROCESSED |

FIRST SUBSTRATE PROCESSING (No. 1–No. 5)

SECOND SUBSTRATE PROCESSING (No. 6–No. 10)

SUBSTRATE PROCESSING APPARATUS, SUBSTRATE PROCESSING METHOD, NON-TRANSITORY COMPUTER-READABLE RECORDING MEDIUM, AND SUBSTRATE TRANSFER METHOD

BACKGROUND

1. Technical Field

The present invention relates to a substrate processing apparatus including a process chamber for collectively processing a prescribed number of substrate, a substrate processing method, a non-transitory computer-readable recording medium, and a substrate transfer method.

2. Description of Related Art

In a substrate processing apparatus including a process chamber for collectively processing a prescribed number of substrate, shortage occurs in some cases in the number of a product substrate required for collective processing. If substrate processing is performed while not placing a substrate for filling the shortage on a substrate placing piece in the process chamber, a generated product is adhered to the substrate placing piece for example, thus having an adverse influence on the processing thereafter on this substrate placing piece. Therefore, there is a method of performing substrate processing by filling the shortage of the substrate with a dummy substrate. For example, patent document 1 discloses a technique of achieving a uniform substrate processing by filling a free space with a dummy lot, which is the space generated on the substrate placing piece at a last of lots.

Meanwhile, when a prescribed number of substrate is transferred into the process chamber, error is sometimes generated at a prescribed place of the substrate processing apparatus. In such a case, there is a necessity for disconnecting the place where the error is generated, and performing a fallback operation for continuing the substrate processing. For example, patent document 2 discloses a technique of switching the processing from a process chamber where the error is generated, to a normal process chamber, to continue the substrate processing, thus improving a production efficiency.

In the substrate processing apparatus including the process chamber for collectively processing a prescribed number of substrate, the substrate during transfer stays at a prescribed position in the substrate processing apparatus when error is generated during transfer of the substrate. Therefore, the shortage of the substrate occurs, although they are required for the collective processing in the process chamber. Such a shortage of the substrate is filled with the dummy substrate. However, if the shortage of the substrate cannot be filled with the dummy substrate for some reason, there is no choice but to stop the processing.

Patent document 1:
Japanese Patent Laid Open Publication No. 2001-250780
Patent document 2:
Japanese Patent Laid Open Publication No. 2006-339662

SUMMARY OF THE INVENTION

An object of the present invention is to provide a substrate processing apparatus, a substrate processing method, a non-transitory computer-readable recording medium, and a substrate transfer method, capable of transferring a substrate required for collective processing, into a process chamber to perform substrate processing, by filling a shortage of the substrate by a dummy substrate, even if the substrate stays at a prescribed position due to error that occurs during transfer of the substrate.

According to a first aspect of the present invention, there is provided a substrate processing apparatus, including a control unit that performs control to transfer a prescribed substrate into each chamber, wherein when error is detected during transfer of the substrate, the control unit performs control to:

specify a place where the error is generated;

select a fallback operation table according to a processing status of the substrate, which is the table defining a processing content for each part of the substrate processing apparatus including the place where the error is generated; and transfer the substrate based on the selected fallback operation table.

According to other aspect of the present invention, there is provided a substrate processing method, which is executed by the substrate processing apparatus according to the first aspect, comprising the steps of:

detecting error during transfer of the substrate;

specifying a place where the error is generated;

selecting a fallback operation table according to the place where the error is generated, which is the table in which a processing content is defined for each part of the substrate processing apparatus including the place where the error is generated, according to a processing status of the substrate; and transferring the substrate based on the selected fallback operation table.

According to the present invention, there is provided the substrate processing apparatus, the substrate processing method, the non-transitory computer-readable recording medium, and the substrate transfer method, capable of continuing the substrate processing without generating the shortage of the substrate required for the collective processing, even if the error is generated during transfer of the substrate and the substrate stays at a disconnected place based on a fallback operation.

BRIEF DESCRIPTION OF THE DRAWINGS

FIG. 4 is an explanatory view of the re-creation of the production list performed by the control unit according to the first embodiment, when the production list is received from the host computer.

FIG. 6 is a view showing setting contents of a fallback operation table, in a case that an error generation place of the substrate processing apparatus according to the first embodiment of the present invention is any one of the process chambers.

FIG. 7 is a view showing the setting contents of the fallback operation table, in a case that the error generation place of the substrate processing apparatus according to the first embodiment of the present invention is any one of the preload chambers.

FIG. 8 is a view showing the setting contents of the fallback operation table, in a case that the error generation place of the substrate processing apparatus according to the first embodiment of the present invention is a gate valve of any one of the process chambers.

FIG. 9 is a view showing the setting contents of the fallback operation table, in a case that the error operation place of the substrate processing apparatus according to the first embodiment of the present invention is the gate valve at a vacuum transfer chamber side of any one of the preload chambers.

FIG. 11 is an explanatory view of the re-creation of the production list which is performed when the fallback operation is started by the control unit according to the first embodiment of the present invention during generation of the error.

FIG. 16 is a view exemplifying a parameter setting screen for setting a parameter for a dummy substrate in the substrate processing apparatus according to a second embodiment of the present invention.

FIG. 21 is an explanatory view of the re-creation of the production list which is performed by the control unit according to the second embodiment of the present invention, when the production list is received from the host computer.

DESCRIPTION OF PREFERRED EMBODIMENT OF THE INVENTION

<First Embodiment of the Present Invention>

A first embodiment of the present invention will be described hereafter.

Figure 1:
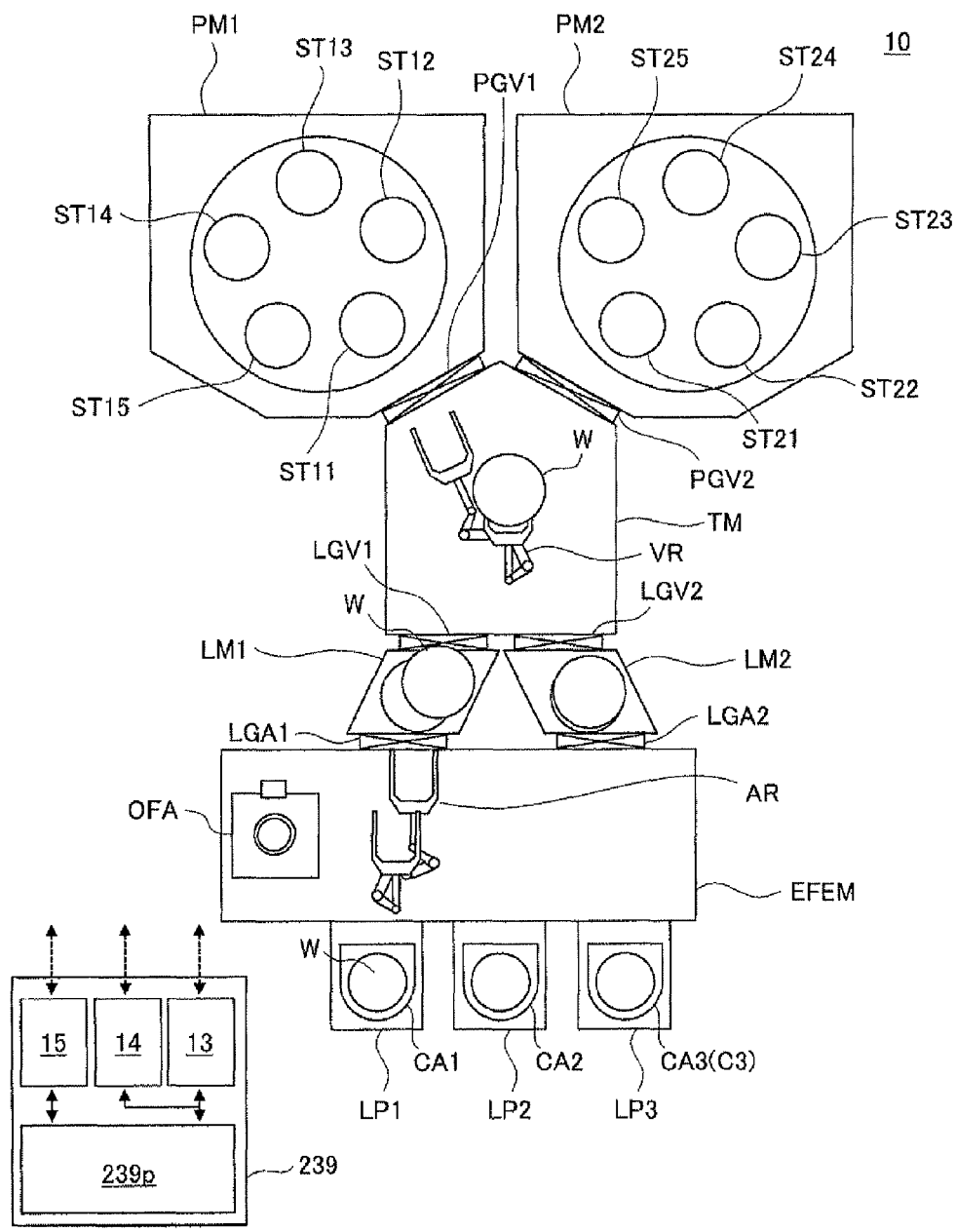
FIG. 1 is a schematic block diagram of a substrate processing apparatus according to a first embodiment of the present invention.

(1) A structure of a substrate processing apparatus according this embodiment will be described first, with reference to FIG. 1. FIG. 1 is a schematic block diagram of a multiple wafer type substrate processing apparatus 10 according to this embodiment.

As shown in FIG. 1, the substrate processing apparatus 10 is divided into a vacuum side and an atmosphere side.

(Structure of the Vacuum Side)

The vacuum side of the substrate processing apparatus 10 includes a vacuum transfer chamber TM (Transfer Module) that can be vacuum-air-tightly closed, load lock chambers (Load Lock Modules) LM1, LM2 as preload chambers, and process chambers (Process Modules) PM1, PM2 as process chambers for collectively processing a plurality of substrates W. The load lock cambers LM1, LM2, and the process chambers PM1, PM2 are disposed to surround an outer periphery of the vacuum transfer chamber TM.

The vacuum transfer chamber TM is configured to withstand a negative pressure (reduced pressure) of less than an atmospheric pressure such as a vacuum state. Note that in this embodiment, a casing of the vacuum transfer chamber TM is formed into a pentagon in a plane view, and is formed into a box shape with its upper and lower both ends closed.

One set of a vacuum robot VR as a transfer unit, is provided for example in the vacuum transfer chamber TM. The vacuum robot VR performs transfer of a substrate W such as a product substrate and a dummy substrate made of silicon (Si), etc., mutually between the load lock chambers LM1, LM2, and the process chambers PM1, PM2, by placing the substrate on two arms being substrate placing parts. In addition, the vacuum robot VR is configured to be elevated while maintaining an air-tight property of the vacuum transfer chamber TM. Further, the two arms can be horizontally extended or retracted, and can be rotatably moved in such a horizontal plane. Further, a substrate detection sensor not shown is set at each front position of the load lock chambers LM1, LM2 and the process chambers PM1, PM2 in the vacuum transfer chamber TM, so that presence of the substrate W on the arm can be detected.

The process chambers PM1, PM2 include substrate placing pieces ST11 to ST15 and ST21 to ST25 on which the substrate W is placed, and are configured as multiple wafer type process chambers for processing every five substrates collectively for example. Namely, the process chambers PM1, PM2 function respectively as the process chambers for adding values to the substrate W, such as etching and ashing using plasma, etc., and film deposition (CVD: Chemical Vapor Deposition), etc., by a chemical reaction.

Further, the process chambers PM1, PM2 include each kind of structure according to its function, such as a gas introduction/exhaust mechanism and a temperature control/plasma discharge mechanism (not shown). These mechanisms include a mass flow controller not shown that controls a flow rate of a process gas supplied into the process chambers PM1, PM2, a pressure controller 15 such as an automatic pressure controller (APC) that controls pressures in the process chambers PM1, PM2, a temperature regulator not shown that controls a temperature in the process chambers PM1, PM2, a valve digital I/O 13 that controls supply of the process gas and on/off of an exhaust valve, and a SW digital I/O 14 that controls on/off of each kind of switch (SW), etc. The above-mentioned each structure is electrically connected to a process chamber controller 239*p*. The structure of a main control part 239 being an apparatus controller including the process chamber controller 239*p* will be described later.

Further, the process chambers PM1, PM2 are continuously connected to the vacuum transfer chamber TM by gate valves PGV1, PGV2. Accordingly, the transfer of the substrate W can be performed under a reduced pressure, between the process chambers PM1, PM2, and the vacuum transfer chamber TM by opening the gate valves PGV1, PGV2. Further, each type of substrate processing can be performed to the substrate W while maintaining the pressure and a process gas atmosphere in the process chambers PM1, PM2 by closing the gate valves PGV1, PGV2.

The load lock chambers LM1, LM2 function as preload chambers for loading the substrate W into the vacuum transfer chamber TM, or function as the preload chambers for unloading the substrate W from the vacuum transfer chamber TM. Buffer stages not shown are respectively provided in the load lock chambers LM1, LM2, as substrate placing parts for temporarily supporting the substrate W during load/unload of the substrate W. The buffer stage may be respectively configured as a multiple stage-type slot for holding a plurality of (for example, two) substrates W.

Further, the load lock chambers LM1, LM2 are respectively connected to the vacuum transfer chamber TM by gate valves LGV1, LGV2 as open/close valves, and are respectively connected to an atmosphere transfer chamber EFEM as will be described later by gate valves LGA1, LGA2. Accordingly, the transfer of the substrate W can be performed under an atmospheric pressure between the load lock chambers LM1, LM2, and the atmospheric transfer chamber EFEM while maintaining the vacuum air-tightness in the vacuum transfer chamber TM, by opening the gate valves LGA1, LGA2 at the atmosphere transfer chamber EFEM side while closing the gate valves LGV1, LGV2 at the vacuum transfer chamber TM side.

Further, the load lock chambers LM1, LM2 are configured to withstand a reduced pressure of less than an atmospheric pressure such as a vacuum state, so that insides thereof can be vacuum-exhausted respectively. Accordingly, the transfer of the substrate W can be performed under the reduced pressure between the load lock chambers LM1, LM2, and the vacuum transfer chamber TM while maintaining the vacuum state in the vacuum transfer chamber TM by opening the gate valves LGV1, LGV2 at the vacuum transfer chamber TM side after vacuum-exhausting the inside of the load lock chambers LM1, LM2 by closing the gate valves LGA1, LGA2 at the atmosphere transfer chamber EFEM side.

(Structure of the Atmosphere Side)

Meanwhile, as described above, at the atmosphere side of the substrate processing apparatus 10, there are provided the atmosphere transfer chamber EFEM (Equipment Front End Module) being a front module connected to the load lock chambers LM1, LM2, and the load ports LP1 to LP3 being substrate housing parts on which carrier cassettes CA1 to CA3 are placed as housing vessels in which twenty-five substrates W are housed per one lot, so as to be connected to the atmosphere transfer chamber EFEM.

One set of an atmosphere robot AR for example, is provided in the atmosphere transfer chamber EFEM as a transfer unit. The atmosphere robot AR performs the transfer of the substrate W, mutually between the load lock chambers LM1, LM2, and the load ports LP1 to LP3. The atmosphere robot AR also has two arms being the substrate placing parts, similarly to the vacuum robot VR. Further, the substrate detection sensor not shown is provided at each front position of the load lock chambers LM1, LM2 in the atmosphere transfer chamber EFEM, so that the presence of the substrate W on the arm can be detected.

Further, an orientation flat aligner OFA for aligning a crystal orientation of the substrate W, is provided in the atmosphere transfer chamber EFEM as a substrate position correcting unit. In a case of a notch type substrate W, the notch aligner can be provided as the substrate position correcting unit. Further, a clean air unit not shown for supplying clean air into the atmosphere transfer chamber EFEM, is provided in the atmosphere transfer chamber EFEM.

Each load port LP1 to LP3 is configured to mount thereon the carrier cassettes CA1 to CA3 respectively being the housing vessels for housing a plurality of substrates W. In the carrier cassettes CA1 to CA3, twenty-five slots not shown per one lot for example, are provided as the housing parts in which the substrates W are housed respectively. When the carrier cassettes CA1 to CA3 are placed on the load ports LP1 to LP3 respectively, the carrier cassettes CA1 to CA3 are configured to read and store barcodes, etc., attached to the carrier cassettes CA1 to CA3, thereby showing carrier ID for identifying the carrier cassettes CA1 to CA3.

Further, a dummy carrier C3 is resident in the load port LP3 for example, out of the load ports LP1 to LP3, as the housing vessel in which the substrate W is housed as the dummy substrate. The substrate W as the product substrate is housed in the carrier cassette CA1 or the carrier cassette CA2 for example, and is placed on the load port LP1 or the load port LP2, and is transferred into the substrate processing apparatus 10, and is subjected to each type of substrate processing. In order to improve a substrate processing ability of the substrate processing apparatus 10, there is a necessity for securing a plurality of transfer spaces for the product substrate, in a tendency of various types of lots in small lots. Therefore, the number of carrier cassettes for the dummy substrates resident in the substrate processing apparatus 10, is preferably limited to one As described above, the substrate processing apparatus 10 of this embodiment has been described. However, the number, structure, and combination of each chamber are not limited thereto, and can be suitably selected.

(2) Structure of an Apparatus Controller

Figure 2:
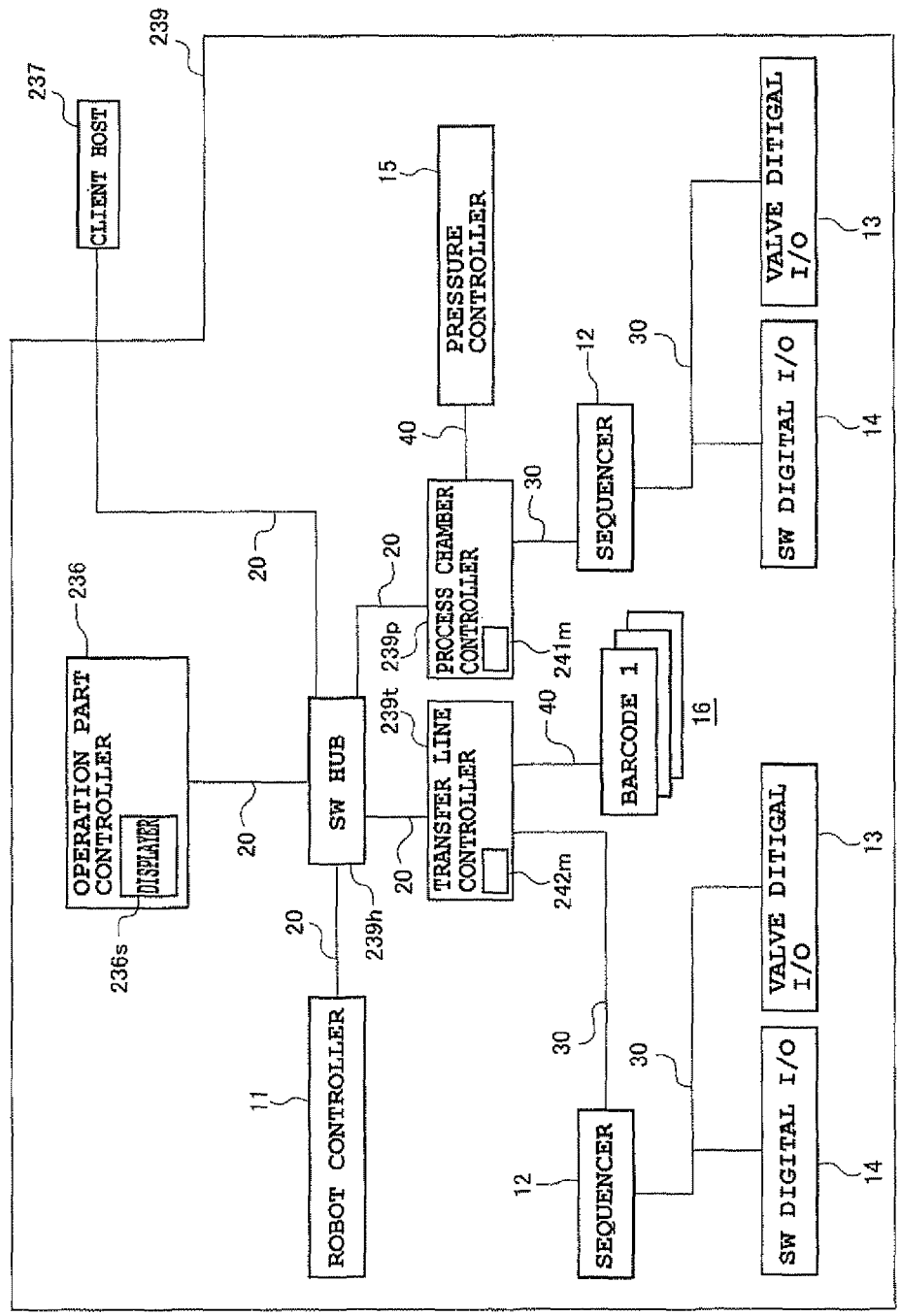
FIG. 2 is a block diagram of an apparatus controller of the substrate processing apparatus according to the first embodiment of the present invention.

The main control part 239 as an apparatus controller for controlling the substrate processing apparatus 10 will be described next, using mainly FIG. 2. FIG. 2 is a block diagram of the main control part (apparatus controller) 239 of the substrate processing apparatus 10.

As shown in FIG. 2, an operation part controller 236, a transfer line controller 239*t* as a control unit, and a process chamber controller 239*p* as other control unit, are provided in the main control part 239 as the apparatus controller via a switching hub 239*h*, so as to be mutually connected by a communication network 20 such as LAN. Further, a robot controller 11 for controlling the vacuum robot VR included in the vacuum transfer chamber TM, and the atmosphere robot AR included in the atmosphere transfer chamber EFEM, are provided via the switching hub 239h by the communication network 20 such as LAN. In addition, a host computer 237 of a client is connected thereto.

The main control part 239 as the apparatus controller is provided in the substrate processing apparatus 10 for example, and includes the transfer line controller 239t and the process chamber controller 239p, to thereby control each part of the substrate processing apparatus 10. The transfer line controller 239t and the process chamber controller 239p may also be provided outside of the substrate processing apparatus 10, instead of being provided in the substrate processing apparatus 10.

The operation part controller 236 is an interface between the controller and an operator, and is configured to receive an operation by the operator through a displayer 236s and an input device, etc., not shown. Further, the operation part controller 236 may also be configured as a general purpose computer. In this case, a program is installed on the general purpose computer using a non-transitory computer-readable recording medium such as a magnetic tape or a hard disc, CD and DVD, etc., in which each kind of program is stored, thus constituting the transfer line controller 239t and the process chamber controller 239p as will be described later. Further, the program may also be installed without through the non-transitory computer-readable recording medium, using a communication means such as Internet or a dedicated line.
(Process Chamber Controller and Transfer Line Controller)

The process chamber controller 239p and the transfer line controller 239t are composed of CPU, etc., for example. Further, ⌈a valve digital I/O⌋ 13 that controls supply of the process gas and on/off of the exhaust valve, and ⌈a SW digital I/O⌋ 14 that controls on/off of each kind of switch (SW), etc., through a digital signal line 30 such as DeviceNet, etc., are respectively connected to the process chamber controller 239p and the transfer line controller 239t via a sequencer 12. Further, the process chamber controller 239p and the transfer line controller 239t include memory units 241m, 242m respectively, in which a process recipe, a transfer recipe, and each kind of program are stored.

The process chamber controller 239p is configured to control substrate processing in the process chambers PM1, PM2. More specifically, a pressure controller 15 such as an automatic pressure controller (APC), etc., that controls the pressure in the process chambers PM1, PM2, is connected to the process chamber controller 239p, through a serial line 40 for example. The process chamber controller 239p outputs control data (control command) for processing the product substrate and the dummy substrate, to the pressure controller 15, the valve for supplying and exhausting the process gas, each kind of switch, mass flow controller, and temperature regulator, etc., to thereby control the substrate processing in the process chambers PM1, PM2, based on the process recipe prepared or edited by the operator through the operation part controller 235 for example.

The transfer line controller 239t is configured to execute a control of transferring the substrate W and a work indicated by the operator. Specifically, a memory part 16 in which barcodes 1, 2, 3 . . . are stored showing the carrier ID for identifying the carrier cassettes CA1 to CA3 placed on the load ports LP1 to LP3, is connected to the transfer line controller 239t through the serial line 40 for example. The transfer line controller 239t outputs control data (control command) for transferring the product substrate and the dummy substrate, to the vacuum robot VR, atmosphere robot AR, each kind of valve, and switch, etc., to thereby control the transfer of the substrate W in the substrate processing apparatus 10, based on a transfer recipe prepared or edited by the operator through the operation part controller 236 for example.

When controlling the transfer of the substrate W, the transfer line controller 239t is configured to manage and re-create a production list in which a transfer order and a processing status of the substrate W are defined, to thereby control the transfer of the substrate W based on the production list. Further, when error is generated during transfer of a prescribed number of substrate W into the process chambers PM1, PM2, the transfer line controller 239t is configured to continue the transfer of the substrate W in accordance with a fallback operation table in which a processing content is defined according to the processing status of the substrate W in each place where the error is generated. Thus, the fallback operation of an automatic production of the substrate W is realized.
(A Production List and a Creation Program of the Production List)

The production list referenced by the transfer line controller 239t during transfer of the substrate W, is transmitted to the main control part 239 from the high order computer such as the host computer 237, and is readably stored in the memory unit 242m, etc., so as to be referenced by the transfer line controller 239t, and the memory unit 242m is included in the main control part 239. In the production list, following items are defined: a position of the load port having the carrier cassette placed thereon, wherein the substrate W is stored in the carrier cassette, and slot number in the carrier cassette of the substrate W, and a transfer order of the substrate W, and an attribute showing the processing status such as "unprocessed", "under process", and "processed". Here, the "unprocessed" indicates a state that the substrate processing is not received yet in the prescribed process chambers PM1, PM2, and the "under process" indicates a state that the substrate processing is in progress in the prescribed process chambers PM1, PM2, and the "processed" indicates a state that the substrate processing is completed in the prescribed process chambers PM1, PM2. As described above, the transfer line controller 239t is configured to re-create the production list as needed.

The re-creation of the production list by the transfer line controller 239t is performed by executing a creation program of the production list stored in the memory unit 242m by the transfer line controller 239t. Such a re-creation of the production list is performed when the production list is received mainly from the host computer 237, and when the error is generated during transfer of the substrate W. Namely, when the production list is received at the time of starting the transfer of the substrate W, the transfer line controller 239t judges whether or not shortage of the substrate needs to be filled with the dummy substrate, from the total number of the product substrate in the production list, so that the dummy substrate is additionally set in the production list as needed. Further, when the substrate W stays at a prescribed position during transfer of the substrate due to the generation of the error, a filler dummy substrate for filling the shortage, is additionally set in the production list. The creation program of the production list may be included in a part of a fallback operation program as will be described later.
(Fallback Operation Table and Fallback Operation Program)

A fallback operation program for executing a fallback operation based on the fallback operation table referenced by the transfer line controller 239t during generation of the error, namely the fallback operation table executed by the transfer line controller 239t during generation of the error, is readably stored in the memory unit 242m which is included in the main control part 239, so as to be referenced by the transfer line controller 239t. A plurality of fallback operation tables are created in each error generation place such as process chambers PM1, PM2, load lock chambers LM1, LM2, gate valves PGV1, PGV2, LGV1, LGV2, LGA1, LGA2, etc. A transfer procedure is defined in each fallback operation table, wherein the transfer procedure is different depending on the processing status such as "unprocessed", "under process", "processed" regarding the substrate W that exist in the process chambers PM1, PM2, the load lock chambers LM1, LM2, and the vacuum transfer chamber TM.

(3) Operation of the Substrate Processing Apparatus

Figure 3:
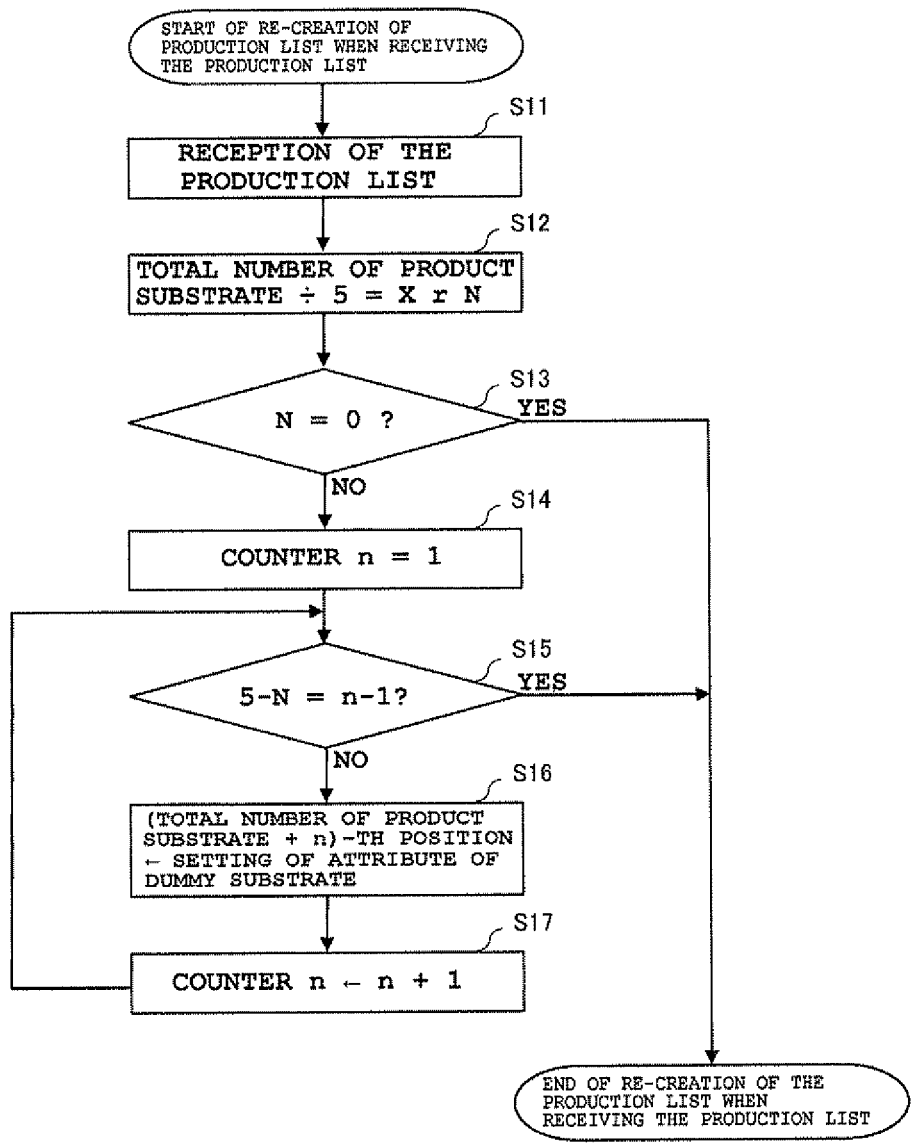
FIG. 3 is a flowchart of a re-creation of a production list performed by a control unit according to the first embodiment, when the production list is received from a host computer.

The operation of the substrate processing apparatus 10 according to this embodiment will be described next, with reference to FIG. 1, FIG. 3, and FIG. 4. FIG. 3 is a flowchart of the re-creation of the production list performed by the transfer line controller 239t of this embodiment, when the production list is received from the host computer 237. FIG. 4 is an explanatory view of the re-creation of the production list performed by the transfer line controller 239t of this embodiment, when the production list is received from the host computer 237. In the explanation given hereafter, the operation of each part of the substrate processing apparatus 10 is controlled by the main control part 239. The substrate processing step performed by such operation and control, is executed as a step of the manufacturing steps of a semiconductor device.

(Transfer into the Atmosphere Transfer Chamber)

First, the gate valves LGV1, LGV2 at the vacuum transfer chamber TM side of the load lock chambers LM1, LM2 are closed, and the gate valves LGA1, LGA2 at the atmosphere transfer chamber EFEM side thereof are opened, to thereby vacuum-exhaust the insides of the vacuum transfer chamber TM and the process chambers PM1, PM2. Simultaneously, clean air is supplied into the atmosphere transfer chamber EFEM so that the pressure of the inside of the atmosphere transfer chamber EFEM is close to the atmospheric pressure.

When the carrier cassette CA1 in which a plurality of product substrates are housed for example, is placed (charged) in the load port LP1 after the above-mentioned each part is prepared, the carrier ID is read for identifying the carrier cassette CA1. Further, the dummy carrier C3 in which the dummy substrate is housed, is previously placed in the load port LP3 for example.

Subsequently, as shown in FIG. 3, the main control part 239 receives the production list from the host computer 237, and stores it in the memory unit 242m (S11). The transfer line controller 239t executes the creation program of the production list, to thereby read the production list from the memory unit 242m and judge whether or not the filler dummy substrate is required. Namely, the total number of the product substrate in the production list is divided by "5" which is the number required for the collective processing in either the process chamber PM1 or the process chamber PM2, to thereby obtain quotient X and residual N (S12). When residual N is zero, quotient X is the number of times required for the substrate processing, and it is so judged that the filler dummy substrate is not required (S13→YES), and a flow of the re-creation of the production list is ended. When the residual N is not zero, (X+1) is the number of times required for the substrate processing, and it is so judged that the filler dummy substrate is required (S13→NO), and the following flow is performed for re-creating the production list.

First, under control of the transfer line controller 239t, a counter n is set to 1 (S14). Next, the attribute of the dummy substrate including information regarding the slot number of the dummy carrier C3 and the processing status, etc., of the dummy substrate, is set at (the total number of the product substrate+n)-th position in the production list (S16), and the counter n is advanced by 1 (S17). Thereafter, S16 and S17 are repeated until the number of times of setting the attribute of the dummy substrate reaches the number of the filler dummy substrate (5-N) (S15) required for filling the shortage. Thus, a re-creation flow of the production list is ended.

FIG. 4 shows an example of the production list re-created based on such a flow. The name of a process recipe "recipe A" is set in the production list received by the main control part 239 in an upper stage of FIG. 4. The "recipe A" defines which process chamber should be selected, and defines what type of substrate processing should be performed. The attribute showing the slot number and the processing status in the load ports and the carrier cassettes of transfer sources of four product substrates in total, are defined at positions No. 1 to No. 4 indicating a transfer order of the substrate W respectively.

The transfer line controller 239t re-creates the received production list as shown in a lower stage of FIG. 4, based on the above-mentioned flow. Namely, the total number of the product substrate in the production list is 4÷5=0 (remainder) 4, and therefore the number of times required for the substrate processing is (0+1) times, and the number of the filler dummy substrate required for filling the shortage is (5-4). Accordingly, the attribute of the substrate is added at a No. 5 position of the production list, wherein the attribute shows the slot number of the load port being the transfer source of one dummy substrate, and the dummy carrier C3 in which the dummy substrate is stored, and the processing status of the dummy substrate.

When the re-creation flow of the production list is ended, the transfer line controller 239t controls each part of the substrate processing apparatus 10, to start the transfer of the substrate W including the dummy substrate and the product substrate, based on the production list. Namely, as shown in FIG. 1, for example, the product substrate of a head position in the carrier cassette CA1 is transferred into the atmosphere transfer chamber EFEM from a prescribed slot in the carrier cassette, which is then placed on the orientation flat aligner OFA, and crystal orientations thereof are aligned.

(Transfer into the Vacuum Transfer Chamber)

Subsequently, the product substrate on the orientation flat aligner OFA is picked-up by the atmosphere robot AR, which is then transferred into the load lock chamber LM1 in an open state of the gate valve LGA1 at the atmosphere transfer chamber EFEM side of the load lock chamber LM1 for example, and is placed on a buffer stage not shown. Then, the gate valve LGA1 is closed, to vacuum-exhaust the inside of the load lock chamber LM1. When the pressure of the inside of the load lock chamber LM1 is reduced to a prescribed pressure, the gate valve LGV1 at the vacuum transfer chamber TM side is opened while maintaining a close state of the gate valve LGA1. Then, the substrate W such as the product substrate, etc., placed in the load lock chamber LM1 is picked-up and is transferred into the vacuum transfer chamber TM.

During transfer of the substrate W described above, the transfer of the substrate W into the vacuum transfer chamber TM using the load lock chamber LM2 is also performed. Namely, while reducing the pressure in the load lock chamber LM1 into which the substrate W is transferred, the substrate W such as a second product substrate in the carrier cassette CA1 for example is also transferred into the load lock chamber LM2 and the vacuum transfer chamber TM based on the same procedure as the above-mentioned procedure.

(Transfer into the Process Chamber)

When the substrate W is transferred into the vacuum transfer chamber TM, the gate valve PGV1 at the process chamber PM1 side is opened for example, to thereby transfer the substrate W into the process chamber PM1, and place the substrate W on the substrate placing piece ST11. The transfer of the substrate W including the product substrate and the dummy substrate based on the production list, is repeated until the substrate W is transferred by the number required for the processing in the process chamber PM1, to thereby fill all substrate placing pieces ST11 to ST15 in the process chamber PM1.

(Processing in the Process Chamber)

After a prescribed number of substrate W is transferred into the process chamber PM1, prescribed processing such as film forming processing using plasma, etc., is applied to the substrate W by supplying the process gas into the process chamber PM1 and heating the substrate W. At this time, the same or different substrate processing is also collectively performed in some cases in the process chamber PM2 as well.

Here, when the substrate processing is performed in a state of not satisfying the number of the substrate required for the collective processing without filling all substrate placing pieces, unnecessary film formation or etching, etc., is applied to the substrate placing piece on which the substrate is not placed, depending on the content of the substrate processing. Particularly, in the substrate processing using plasma, a change of electrical properties occurs, and a change of a substrate processing performance also occurs accordingly on the substrate placing piece being a plasma electrode, resulting in a deterioration of the film forming properties and etching properties.

In this embodiment, the production list is re-created as needed, and the shortage of the product substrate is filled with the dummy substrate, so as to fill all substrate placing pieces ST11 to ST15. Therefore, the substrate W is placed on all substrate placing pieces ST11 to ST15, and unnecessary substrate processing is prevented from being applied to the substrate placing pieces ST11 to ST15. Therefore, stable substrate processing properties can be obtained, such as film forming properties and etching properties.

(Transfer into the Load Lock Chamber)

When all required processing is completed, the processed substrate W placed on the substrate placing pieces ST11 to ST15 in the process chamber PM1 is picked-up, and is transferred into the load lock chamber LM1 by opening the gave valve LGV1 at the vacuum transfer chamber TM side of the load lock chamber LM1 for example, and is placed on the buffer stage. Thereafter, the gate valve LGV1 is closed, and the clean gas is supplied into the load lock chamber LM1, and the pressure in the load lock chamber LM1 is returned to the pressure close to the atmospheric pressure, and the gate valve LGA1 at the atmosphere transfer chamber EFEM side is opened.

(Storage into the Carrier Cassette)

Subsequently, the processed product substrate placed in the load lock chamber LM1 is picked-up by the atmosphere robot AR, and is transferred to the carrier cassette CA1 placed on the load port LP1 for example, and is stored in a free slot. Further, if there is the dummy substrate placed in the load lock chamber LM1, the dummy substrate is picked-up, and is transferred to the dummy carrier C3 placed on the load port LP3 for example, and is stored in the free slot. When all processed substrates W are stored in a prescribed carrier cassette CA1 and a prescribed dummy carrier C3, etc., the carrier cassette CA1 in which the processed product substrate is stored, is unloaded from the load port LP1 while maintaining a resident state of the dummy carrier C3 with the dummy substrate stored therein in the load port LP3, and an automatic transfer processing is completed.

As described above, the transfer of the substrate W in the substrate processing apparatus 10 is started when the carrier cassette having the substrate W such as product substrate and dummy substrate stored therein, is placed on any one of the load ports. Then, the transfer of the substrate W is ended when the last substrate W is stored in the carrier cassette. Namely, a transfer state of the substrate W includes a state such as a temporary stop state of the operation of each part of the vacuum robot VR, the atmosphere robot AR, and the orientation flat aligner OFA, etc., regarding the transfer of the substrate. This is caused by standby for increase or decrease of the pressure in the load lock chambers LM1, LM2, standby for the end of the substrate processing in the process chambers PM1, PM2, and standby for switching to the fallback operation when error is generated.

(4) Fallback Operation of the Substrate Processing Apparatus

In a series of the operation of the substrate processing apparatus 10, error is sometimes generated in a prescribed place such as the process chambers PM1, PM2, load lock chambers LM1, LM2, and gate valves PGV1, PGV2, LGV1, LGV2, LGA1, LGA2. In this case, the transfer line controller 239t disconnects an error place, and continues the substrate processing based on the fallback operation table. The fallback operation of the substrate processing apparatus 10 will be described hereafter using FIG. 5 to FIG. 9.

Figure 5:
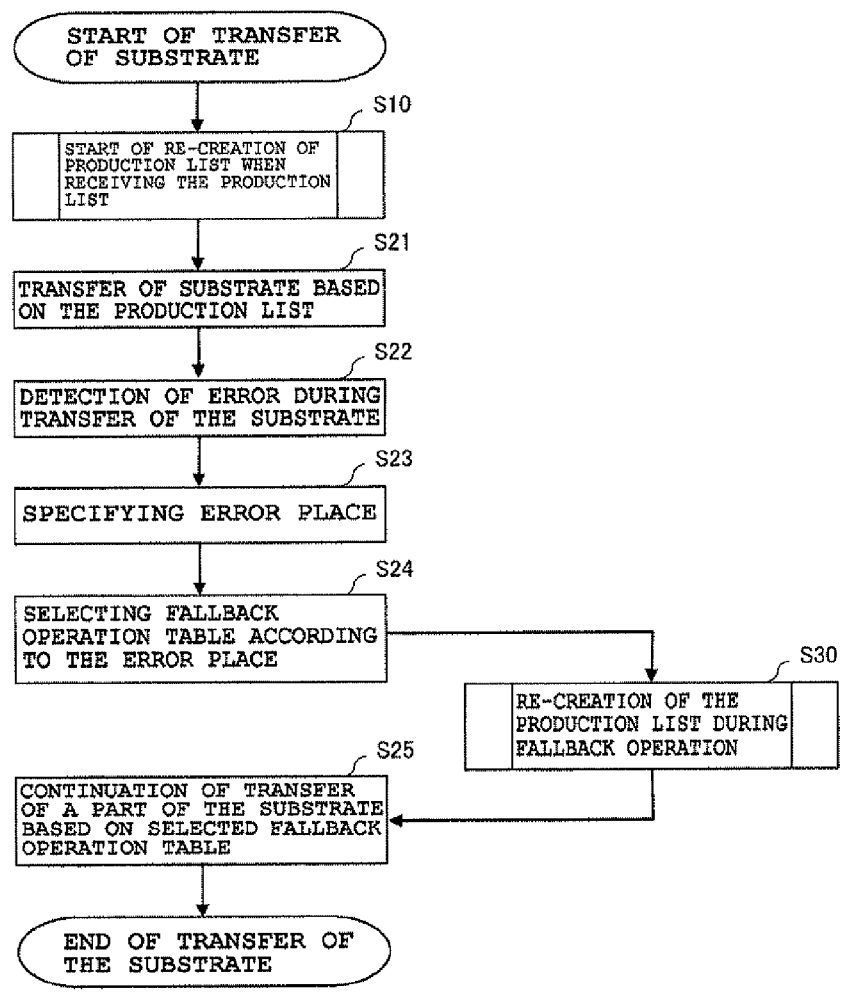
FIG. 5 is a flowchart of a substrate transfer including a fallback operation performed by the control unit according to the first embodiment of the present invention when error is generated.

FIG. 5 is a flowchart of the transfer of the substrate including the fallback operation performed by the transfer line controller 239t of this embodiment, when the error is generated. FIG. 6 to FIG. 9 are views showing a setting content of the fallback operation table in each error generation place of the substrate processing apparatus 10 according to the first embodiment of the present invention. In the explanation given hereafter, the operation of each part of the substrate processing apparatus 10 is controlled by the main control part 239.

(Flow of the Fallback Operation)

As shown in FIG. 5, the transfer line controller 239t controls (S21) the transfer of the substrate W based on the production list which is received from the host computer 237 and is re-created as needed (S10). When the error is generated during transfer of the substrate w, an error message showing the generation of error is transmitted to the transfer line controller 239t. Thus, the error is detected by the transfer line controller 239t (S22). The transfer line controller 239t that detects the error executes the fallback operation program to thereby decode the reported error message, and specifies the error place (S23). Next, the fallback operation table according to the error place is selected (S24), and the transfer of at least some of the substrates W is continued based on the selected fallback operation table (S25). At this time, the transfer line controller 239t re-creates the production list as needed (S30). The re-creation of the production list will be described later.

Explanation is given hereafter for several patterns of the processing content of the transfer, etc., of the substrate W performed by a different procedure according to the processing status of the substrate W, based on the fallback operation table previously created for each error generation place.

(A Case that the Error Place is the Process Chamber)

FIG. 6 shows the setting content of the fallback operation table in a case that the error generation place is either the process chamber PM1 or the process chamber PM2. In this case, the process chamber where the error is generated, is disconnected and the substrate processing is continued based on the fallback operation, using each part excluding the process chamber where the error is generated.

Namely, as shown in FIG. 6, the substrate W that exists in the process chamber where the error is generated (called abnormal PM hereafter) stays in this abnormal PM.

A different processing content is applied to the substrate W that exists in the process chamber where the error is not generated (called normal PM hereafter), according to the processing status of the substrate W. When the substrate W in the normal PM is "unprocessed", prescribed substrate processing is applied thereto, and thereafter the substrate W is returned to the carrier cassette. The substrate W of "under process" stands-by for a normal end of the substrate processing, and the substrate W is returned to the carrier cassette. Thus, the "processed" substrate W is returned to the carrier cassette.

Further, the processing of the unprocessed substrate W remained in the carrier cassette is continued using the normal PM. When the shortage is generated in the unprocessed substrates required for the collective processing, the production list is re-created by the transfer line controller 239t, so that the attribute of the filler dummy substrate, is added to the production list. Thus, the shortage is filled with the dummy substrate, to thereby continue the substrate processing.

Regarding the substrate W positioned in each part excluding the process chambers PM1, PM2, namely, in the vacuum transfer chamber TM, in the load lock chambers LM1, LM2, in the atmosphere transfer chamber EFEM, and on the orientation flat aligner OFA, the transfer operation thereof is continued based on the production list.

(A Case that the Error Place is the Load Lock Chamber)

FIG. 7 shows the setting content of the fallback operation table in a case that the error generation place is either the load lock chamber LM1 or the load lock chamber LM2. The error of the load lock chambers LM1, LM2 includes a case that the error is generated in the load lock chambers LM1, LM2 themselves, and also includes a case that the error is generated in either the gate valve LGA1 or the gate valve LGA2 at the atmosphere transfer chamber EFEM side of the load lock chambers LM1, LM2. When the error is generated in the gate valves LGA1, LGA2, the control of reducing the pressure in the load lock chambers LM1, LM2 cannot be performed, and therefore in the above-mentioned each case, the load lock chambers LM1, LM2 cannot be used, and the setting content of the fallback operation table is the same.

Specifically, the upper stage of FIG. 7 shows a case that the error is generated in either the load lock chamber LM1 or the load lock chamber LM2, and the lower stage of FIG. 7 shows a case that the error is generated in either the gate valve LGA1 or the gate valve LGA2. In these cases, the load lock chamber at the side where the error is generated, is disconnected and the substrate processing is continued based on the fallback operation, using each part excluding the load lock chamber where the error is generated.

Namely, as shown in FIG. 7, the substrate W that exists in the load lock chamber where the error is generated (called abnormal LM hereafter), stays in this abnormal LM, irrespective of the attribute of the substrate showing the processing status of the substrate W.

Regarding the substrate W that exists in the load lock chamber where the error is not generated (called normal LM hereafter), the transfer operation thereof is continued based on the production list irrespective of the processing status. Hereafter, the transfer of the substrate W is continued through the normal LM.

A different processing content is applied to the substrate W that exists in the process chambers PM1, PM2, according to the processing status of the substrate W. When the substrate W is "unprocessed", prescribed substrate processing is applied thereto, and thereafter the substrate W is returned to the carrier cassette. The substrate W of "under process" stands-by for the normal end of the substrate processing, and is returned to the carrier cassette. Thus, the "processed" substrate W is returned to the carrier cassette. Hereafter, the processing of the unprocessed substrate W transferred through the normal LM is continued in the process chambers PM1, PM2. When the shortage is generated in the number of unprocessed substrate required for the collective processing, the production list is re-created by the transfer line controller 239t, for adding the attribute of the filler dummy substrate, and thereafter the transfer is continued.

In addition, the transfer operation is continued based on the production list, in the vacuum transfer chamber TM, in the atmosphere transfer chamber EFEM, and on the orientation flat aligner OFA as well, irrespective of the processing status of the substrate W.

(A Case that the Error Place is the Gate Valve of the Process Chamber)

FIG. 8 shows the setting content of the fallback operation table in a case that the error generation place is the gate valves PGV1, PGV2 of either the process chamber PM1 or the process chamber PM2. In this case, the substrate processing cannot be continued, and therefore the process chambers PM1, PM2, and the vacuum transfer chamber TM are disconnected, and the substrate W is withdrawn from each part excluding these chambers.

In the substrate processing apparatus 10, simultaneous opening of two or more gate valves coupled to the vacuum transfer chamber TM is inhibited, from a viewpoint of suppressing a diffusion of particles, etc. Accordingly, when the error is generated in either the gate valve PGV1 or the gate valve PGV2, load/unload of the substrate into/from the vacuum transfer chamber TM is stopped to avoid such a simultaneous open state. Namely, as shown in FIG. 8, the substrate W that exists in the vacuum transfer chamber TM stays in this vacuum transfer chamber TM, irrespective of the attribute of the substrate showing the processing status of the substrate W.

Regarding the substrate W that exists in the process chambers PM1, PM2, the transfer content according to the processing status of the substrate W is applied to both the side where the error is generated, and the side where the error is not generated (called an abnormal side PM and a normal side PM hereafter). The "unprocessed" or the "processed" substrate W stays in this process chamber. The substrate W "under process" stands-by for the normal end of the substrate processing and stays in the process chambers PM1, PM2. The pressure in the process chambers PM1, PM2 is increased to the pressure close to the atmospheric pressure thereafter.

Further, the substrate processing cannot be continued as described above, and therefore the substrates W positioned in the load lock chambers LM1, LM2, in the atmosphere transfer chamber EFEM, and on the orientation flat aligner OFA, are withdrawn into the carrier cassette, irrespective of the attribute of the substrate.

The substrates W that stay in the vacuum transfer chamber TM and in the process chambers PM1, PM2, are withdrawn in a vacuum state between the vacuum transfer chamber TM and the load lock chambers LM1, LM2. When such a withdrawal in a vacuum state is not possible, the substrate W is not withdrawn until the pressure at least in the vacuum transfer chamber TM and the process chambers PM1, PM2 becomes close to the atmospheric pressure. If there is the substrate W that can be withdrawn through a route capable of transferring the substrate W after the pressure in the vacuum transfer chamber TM and the process chambers PM1, PM2 reaches the pressure close to the atmospheric pressure, the substrate W is transferred under the atmospheric pressure and is withdrawn into the carrier cassette. At this time, it is also acceptable that an atmospheric pressure sensor is provided in the vacuum transfer chamber TM for example, and when a sensor value reaches a prescribed value close to the atmospheric pressure, the substrate W is withdrawn.

(A Case that the Error Place is the Gate Valve at the Vacuum Transfer Chamber Side of the Load Lock Chamber)

FIG. 9 shows the setting content of the fallback operation table in a case that the error generation place is the gate valves LGV1, LGV2, at the vacuum transfer chamber TM side of either the load lock chamber LM1 or the load lock chamber LM2. In this case, the substrate processing cannot be continued, and therefore the process chambers PM1, PM2, the vacuum transfer chamber TM, and the load lock chamber at the side where the error is generated, are disconnected, and the substrate W is withdrawn from each part excluding these chambers.

Namely, as described above, in order to avoid the simultaneous open state of two or more gate valves coupled to the vacuum transfer chamber TM, the load/unload of the substrate W into/from the vacuum transfer chamber TM is stopped, and as shown in FIG. 9, the substrate W that exists in the vacuum transfer chamber TM stays in this vacuum transfer chamber TM, irrespective of the attribute of the substrate showing the processing status of the substrate W.

The processing content according to the processing status of the substrate W is applied to the substrate W that exists in the process chambers PM1, PM2. The "unprocessed" or the "processed" substrate W stays this process chamber. The "processed" substrate W stands-by for the normal end of the substrate processing and stays in these process chambers PM1, PM2. The pressure in the process chambers PM1, PM2 is increased thereafter to the pressure close to the atmospheric pressure.

The substrate W that exists in the load lock chamber where the error is generated (called abnormal side LM hereafter), stays in this abnormal side LM irrespective of the attribute of the substrate. The pressure in the abnormal side LM is returned to the pressure close to the atmospheric pressure thereafter.

Further, as described above, the substrate processing cannot be continued, and therefore the substrate W in the load lock chamber, in the atmosphere transfer chamber EFEM, and on the orientation flat aligner OFA, where the error is not generated (called normal side LM hereafter, is withdrawn into the carrier cassette irrespective of the attribute of the substrate).

Further, the stayed substrate W is withdrawn in the vacuum state between the vacuum transfer chamber TM and the normal side LM. However, if the recovery in the vacuum state is impossible, the substrate W that stays in the vacuum transfer chamber TM, in the process chambers PM1, PM2, and in the abnormal side LM, is not withdrawn at least until the pressure in the vacuum transfer chamber TM, the process chambers PM1, PM2, the abnormal side LM, and the abnormal side LM reaches the pressure close to the atmospheric pressure. After the pressure in the vacuum transfer chamber TM, the process chambers PM1, PM2, and the abnormal side LM reaches the pressure close to the atmospheric pressure, the substrate W is transferred under the atmospheric pressure and is withdrawn into the carrier cassette if there is the substrate W that can be withdrawn through a route capable of transferring the substrate W. At this time, it is also acceptable that an atmospheric pressure sensor is provided in the vacuum transfer chamber TM for example, and when a sensor value reaches a prescribed value close to the atmospheric pressure, the substrate W is withdrawn.

As described above, in this embodiment, even if the error is generated in the substrate processing apparatus 10, the place where the error is generated is disconnected based on the fallback operation, and the substrate processing can be continued. Thus, productivity of the substrate processing apparatus 10 can be improved. Further, even if the substrate processing cannot be continued, the substrate W in the substrate processing apparatus 10 can be speedily withdrawn, and a restoration work can be speedily started. Therefore, downtime of the substrate processing apparatus 10 can be shortened.

(5) Re-Creation of the Production List Upon Starting the Fallback Operation.

Figure 10:
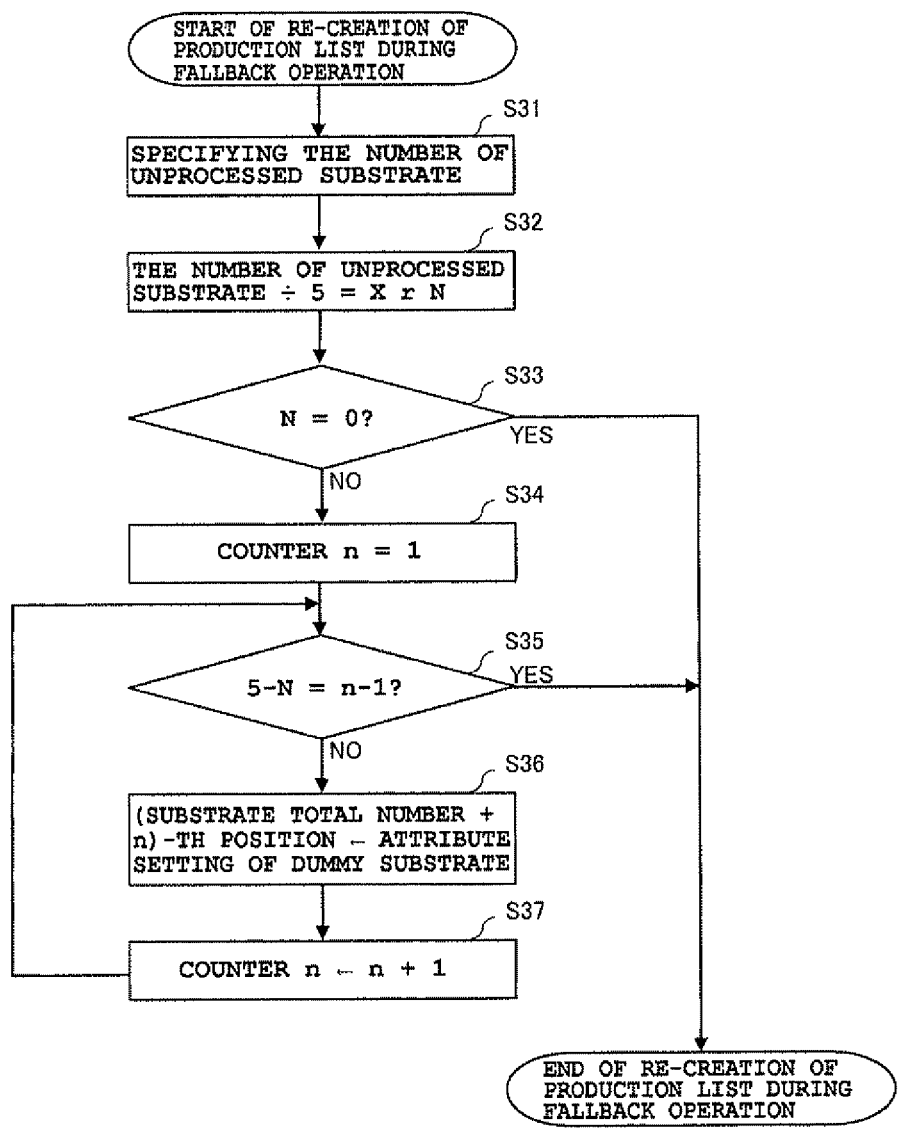
FIG. 10 is a flowchart of the re-creation of the production list which is performed by the control unit according to the first embodiment of the present invention when the fallback operation is started during generation of error.

Next, the re-creation of the production list performed as needed during fallback operation of the substrate processing apparatus 10, will be described using FIG. 10 to FIG. 15. FIG. 10 is a flowchart of the re-creation of the production list performed by the transfer line controller 239t of this embodiment, when the fallback operation is started during generation of error. FIG. 11 is an explanatory view of the re-creation of the production list performed by the transfer line controller 239t of this embodiment, when the fallback operation is started by the control unit according to the first embodiment of the present invention during generation of the error. FIG. 12 to FIG. 15 are views showing a state of the fallback operation in each place of the substrate processing apparatus 10 of this embodiment where the error is generated. In the explanation given hereafter as well, the operation of each part of the substrate processing apparatus 10 is controlled by the main control part 239.

(Re-Creation of the Production List)

As shown in FIG. 10, when the fallback operation is started in a case that the error is generated in the substrate processing apparatus 10, the transfer line controller 239t performs re-creation of the production list as needed. Namely, by executing the creation program of the production list, the transfer line controller 239t reads the production list from the memory unit 242m, then excludes the substrate W that stays in a prescribed place based on the fallback operation, and specifies the number of the unprocessed substrate W included in the production list (S31). Next, the transfer line controller 239t divides the number of the unprocessed substrates W by the number of substrate (5) required for the collective processing, to thereby obtain the quotient X and the remainder N (S32). When the remainder N is zero, the quotient X is the number of times required for processing the remained substrate W, and it is so judged that the substrate W needs not to be filled with the dummy substrate (S33→YES), and the flow of the re-creation of the production list is ended. When the quotient N is not zero, (X+1) is the number of times required for processing the remained substrate W, and it is so judged that the substrate W needs to be filled with the dummy substrate (S33→NO), and the following flow of re-creating the production list is performed.

First, under control of the transfer line controller 239t, the counter n is set to 1 (S34). Next, the attribute of the dummy substrate is set at the (total number of substrates+n)-th position of the production list (S36), and the counter n is advanced by 1 (S37). Thereafter, S36 and S37 are repeated until the number of times of setting the attribute of the dummy substrate reaches the number of the filler dummy substrate (5-N) required for filling the shortage (S35). As described above, the re-creation flow of the production list is ended.

FIG. 11 shows an example of the production list re-created by such a flow. The name of a process recipe "recipe A" is set in the production list being referenced by the main control part 239 in the upper stage of FIG. 11. The "recipe A" defines which process chamber should be selected, and defines what kind of substrate processing should be performed. The attributes of four product substrates are defined at positions of No. 1 to No. 4, and the attribute of one dummy substrate is defined at a position of No. 5.

In a case that the error is generated in the process chamber PM1 when the product substrates of No. 1 to No. 3 are transferred into the process chamber PM1 under control of the main control part 239 based on the production list, and when the fallback operation is started, the transfer line controller 239t re-creates the production list as shown in a lower stage of FIG. 11 based on the above-mentioned flow. Namely, the number of unprocessed substrates of No. 4 to No. 5 excluding three product substrates that stay in the process chamber PM1 in the production list is 2÷5=0 (remainder) 2. Therefore, the number of times required for the substrate processing is (0+1) times, and the number of the filler dummy substrate required for filling the shortage is (5−2). Accordingly, the attributes of three dummy substrates are added at positions of No. 6 to No. 8 of the production list.

Hereafter, the substrate processing is continued by the transfer line controller 239t, based on the fallback operation table selected in accordance with the place where the error is generated, and based on the production list re-created as needed. Explanation will be given hereafter for several patterns of the processing of the substrate W and the procedure of the transferring the substrate W, when the re-creation of the production list is required.

(A Case that the Error Place is the Process Chamber)

First, based on FIG. 12 and FIG. 13, explanation will be given for a procedure when the error is generated in either the process chamber PM1 or the process chamber PM2, under process of the substrate W of a single lot or a plurality of lots. In this case, the fallback operation table shown in FIG. 6 is selected. In the explanation given hereafter, explanation is given for a case that the attribute of the substrate W is "unprocessed" in the normal PM out of the process chambers shown in FIG. 6.

Figure 12:
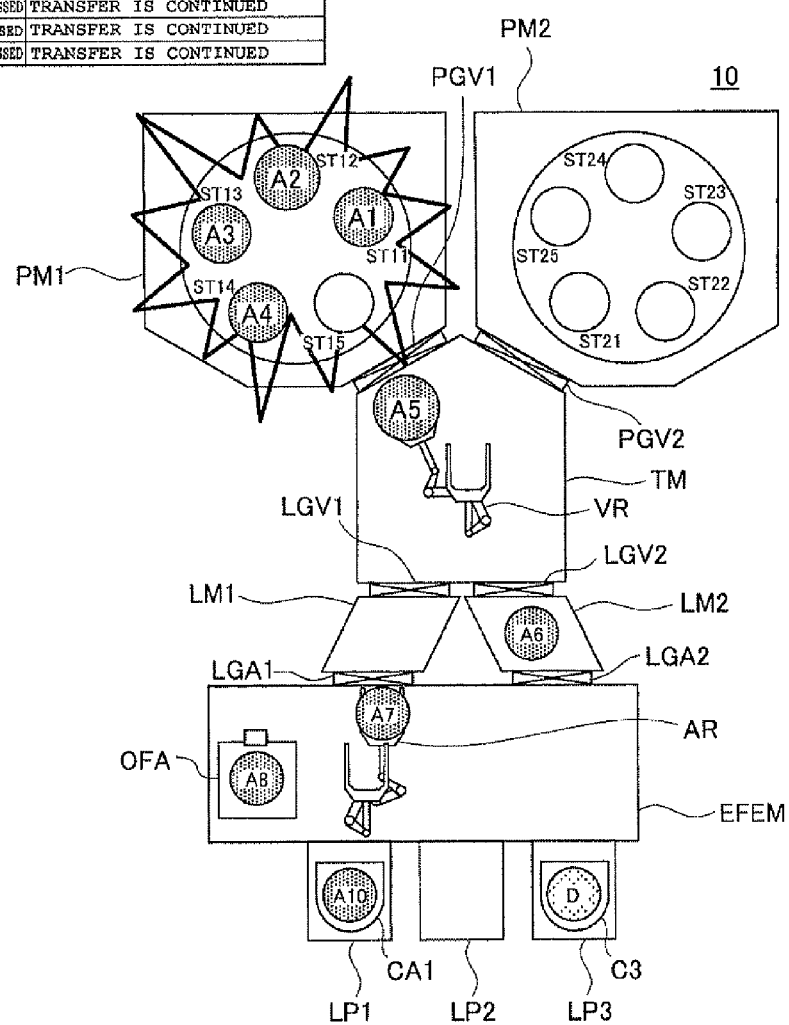
FIG. 12 is a view showing a state of the fallback operation in a case of processing a substrate of a singular lot, when error is generated in any one of the process chambers of the substrate processing apparatus according to the first embodiment of the present invention.

FIG. 12 is a view showing a state of the fallback operation when the error is generated in either the process chamber PM1 or the process chamber PM2, when processing the substrate W of a single lot. In FIG. 12, the carrier cassette CA1 in which a lot A having ten product substrates A1 to A10 are housed, is placed on the load port LP1. An initial production list has a content that the product substrates A1 to A5 are processed in the process chamber PM1, and the product substrates A6 to A10 are processed in the process chamber PM2 without using the filler dummy substrate D. Further, the error is generated in the process chamber PM1 into which unprocessed product substrates A1 to A4 are transferred, during transfer of the unprocessed product substrate A5 into the vacuum transfer chamber TM from the load lock chamber LM1 based on the production list. Moreover, unprocessed product substrates A6 to A8 are also transferred into the load lock chamber LM2, into the atmosphere transfer chamber EFEM, and on the orientation flat aligner OFA respectively based on the production list.

In the above-mentioned case, the unprocessed product substrates A1 to A4 that exist in the process chamber PM1, stay in this process chamber PM1. Further, the remained unprocessed product substrates A5 to A10 are six, which is not a multiple of the number of substrate "5" required for the collective processing, and the shortage is generated in the number of substrate. Therefore, the production list is re-created by the transfer line controller 239t.

Namely, the transfer line controller 239t re-creates the production list so that the product substrates A5 to A9 are transferred into the process chamber PM2 and are subjected to processing, and subsequently the product substrate A10 and the dummy substrate D are transferred into the process chamber PM2 and are subjected to processing. Thereafter, the transfer line controller 239t continues the substrate processing based on the re-created production list. Thus, the processing is ended. The lot A is handled as abnormal end.

Figure 13:
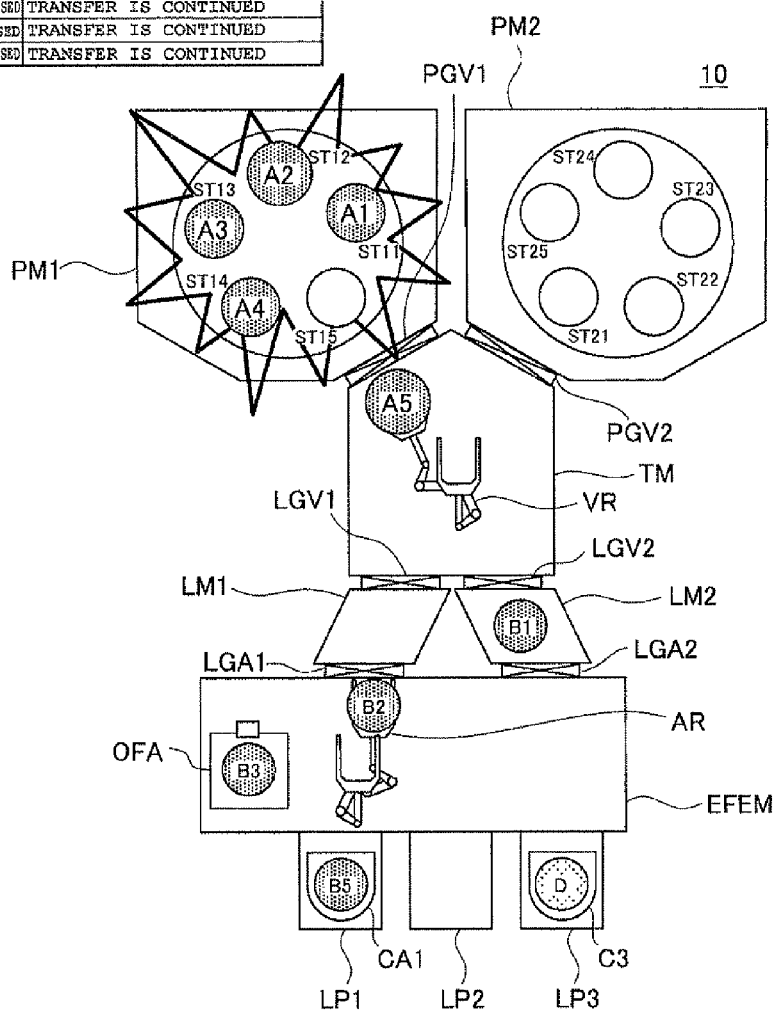
FIG. 13 is a view showing a state of the fallback operation in a case of processing a substrate of a plurality of lots, when error is generated in any one of the process chambers of the substrate processing apparatus according to the first embodiment of the present invention.

FIG. 13 will be described next.

FIG. 13 is a view showing the state of the fallback operation when the error is generated in either the process chamber PM1 or the process chamber PM2, in a case of processing the substrate W of a plurality of lots. In FIG. 13, the carrier cassette CA1 is placed on the load port LP1. In the carrier cassette CA1, the lot A having five product substrates A1 to A5, and the lot B having five product substrates B1 to B5 are housed. The initial production list has a content that the product substrates A1 to A5 of the lot A are processed in the process chamber PM1, and the product substrates B1 to B5 of the lot B are processed in the process chamber PM2, without using the filler dummy substrate D. Further, the error is generated in the process chamber PM1 into which the unprocessed product substrates A1 to A4 are transferred, during transfer of the unprocessed product substrate A5 into the vacuum transfer chamber TM from the load lock chamber LM1 based on the production list. Further, the unprocessed product substrates B1 to B3 are also transferred into the load lock chamber LM2, into the atmosphere transfer chamber EFEM, and on the orientation flat aligner OFA respectively, based on the production list.

In the above-mentioned case, the unprocessed product substrates A1 to A4 that exist in the process chamber PM1, stay in this process chamber PM1. Further, the lots of the remained unprocessed product substrates A5, B1 to B5 are different respectively, and therefore the collective processing in the same process chamber is not performed under production control. Therefore, only one product substrate A5 of the lot A remains, which does not meet the number of substrate "5" required for the collective processing, thus generating the shortage. Therefore, the production list is re-created by the transfer line controller 239t.

Namely, the transfer line controller 239t re-creates the production list so that the product substrate A5 and four dummy substrates D are transferred into the process chamber PM2 and are subjected to processing, and subsequently the product substrates B1 to B5 are also transferred into the process chamber PM2 and are subjected to processing. Thereafter, the transfer line controller 239t continues the substrate processing based on the re-created production list. More specifically, the product substrate A5 is transferred into the process chamber PM2, and the product substrates B1 to B3 are withdrawn into the carrier cassette CA1 once. Subsequently, four dummy substrates D are transferred into the process chamber PM2 and are subjected to processing together with the product substrate A5, which are then returned to the dummy carrier C3 and the carrier cassette CA1 respectively, and thereafter the product substrates B1 to B3 are re-transferred into the process chamber PM2, and the product substrates B4, B5 are newly transferred, and are subjected to substrate processing. The lot A is handled as abnormal end, and the lot B is handled as normal end.

(A Case that the Error Place is the Load Lock Chamber)

Subsequently, using FIG. 14 and FIG. 15, explanation is given for a case that the error is generated in either the load lock chamber LM1 or the load lock chamber LM2, namely in the load lock chambers LM1, LM2 themselves, and in either the gate valve LGA1 or the gate valve LGA2 at the atmosphere transfer chamber EFEM side, when the substrate W of a single lot or a plurality of lots is processed. In such a case, the fallback operation table shown in FIG. 7 is selected, and in each case, the same procedure is performed. Explanation is given hereafter for a case that the attribute of the substrate W is "unprocessed" in the process chambers PM1, PM2 out of the process chambers shown in FIG. 7.

Figure 14:
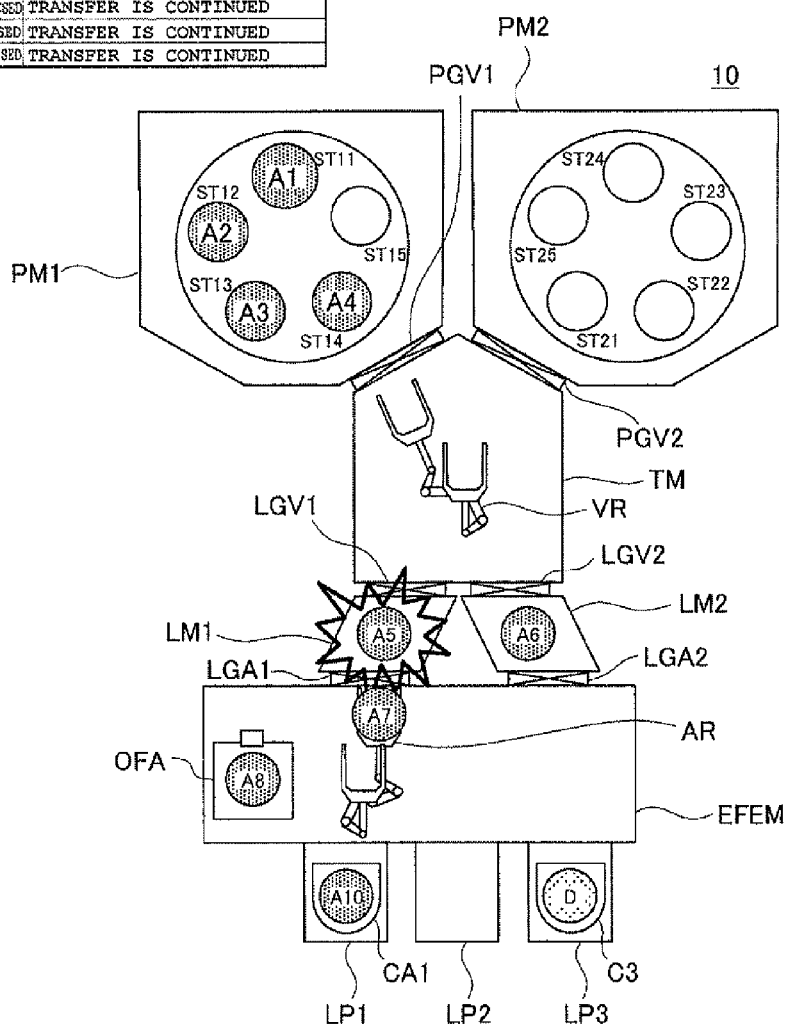
FIG. 14 is a view showing a state of the fallback operation in a case of processing the substrate of a singular lot, when error is generated in any one of the load lock chambers of the substrate processing apparatus according to the first embodiment of the present invention.

FIG. 14 is a view showing the state of the fallback operation when the error is generated in either the load lock chamber LM1 or the load lock chamber LM2, when the substrate W of a single lot is processed. Details of the product substrate to be processed and the content of the production list in FIG. 14 are the same as those of a case in FIG. 12. Further, in FIG. 14, the error is generated in the load lock chamber LM1 into which the unprocessed product substrate A5 is transferred, during transfer of the unprocessed product substrate A4 from the vacuum transfer chamber TM into the process chamber PM1 into which the unprocessed product substrates A1 to A3 are transferred based on the production list. Moreover, the unprocessed product substrates A6 to A8 are also transferred respectively into the load lock chamber LM2, into the atmosphere transfer chamber EFERM, and on the orientation flat aligner OFA, based on the production list.

In the above-mentioned case, the unprocessed product substrate A5 that exists in the load lock chamber LM1 stays in this load lock chamber LM1. Further, the number of the remained unprocessed product substrates A1 to A4, A6 to A10 is nine, which is not the multiple of the number of substrate "5" required for the collective processing, thus generating the shortage in the number of substrate. Therefore, the production list is re-created by the transfer line controller 239t.

Namely, the transfer line controller 239t re-creates the production list so that the product substrate A6 is further transferred into the process chamber PM1 into which the product substrates A1 to A4 are transferred, and subsequently the product substrates A7 to A10 and one dummy substrate D are transferred into the process chamber PM1 and are subjected to processing. Thereafter, the transfer line controller 239t continues and ends the substrate processing based on the re-created production list. The lot A is handled as the abnormal end.

Figure 15:
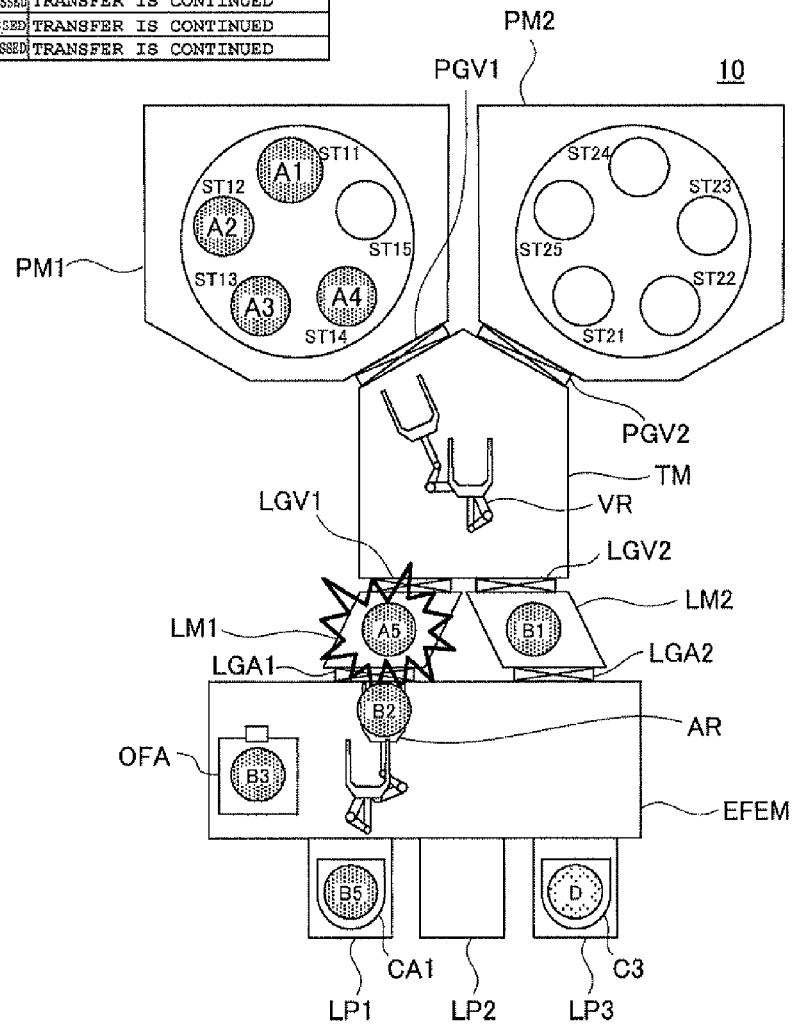
FIG. 15 is a view showing a state of the fallback operation in a case of processing the substrate of a plurality of lots when error is generated in any one of the load lock chambers of the substrate processing apparatus according to the first embodiment of the present invention.

FIG. 15 will be described next.

FIG. 15 is a view showing the state of the fallback operation when the error is generated in either the load lock chamber LM1 or the load lock chamber LM2, in a case of processing the substrate W of a plurality of lots. Details of the product substrate to be processed and the content of the production list in FIG. 15 are the same as those of a case in FIG. 13. Further, in FIG. 15, the error is generated in the load lock chamber LM1 into which the unprocessed product substrates A1 to A3 are transferred, during transfer of the unprocessed product substrate A4 from the vacuum transfer chamber TM into the process chamber PM1 into which the unprocessed product substrates A1 to A3 are transferred based on the production list. Moreover, the unprocessed product substrates B1 to B3 are also transferred respectively into the load lock chamber LM2, into the atmosphere transfer chamber EFERM, and on the orientation flat aligner OFA, based on the production list.

In the above-mentioned case, the unprocessed product substrate A5 that exists in the load lock chamber LM1 stays in this load lock chamber LM1. Further, four product substrates A1 to A4 of different lots from the lots of B1 to B5 out of the remained unprocessed product substrates A1 to A4 and B1 to B5, don't meet the number of substrate "5" required for the collective processing. Therefore, the production list is re-created by the transfer line controller 239t.

Namely, the transfer line controller 239t re-creates the production list, so that one dummy substrate D is transferred into the process chamber PM1 into which the product substrates A1 to A4 are transferred and are subjected to collective processing, and meanwhile the product substrates B1 to B5 are transferred into the process chamber PM2 and are subjected to processing. Thereafter, the transfer line controller 239t continues the substrate processing based on the re-created production list. More specifically, the product substrates B1 to B3 are withdrawn into the carrier cassette CA1 once. Subsequently, one dummy substrate D is transferred into the process chamber PM1, and thereafter the product substrates B1 to B3 are re-transferred into the process chamber PM2, and further the product substrates B4, B5 are newly transferred into the process chamber PM2. Thereafter, the product substrates A1 to A4 and one dummy substrate D are processed in the process chamber PM1, and the product substrates B1 to B5 are processed in the process chamber PM2. The lot A is handled as the abnormal end, and the lot B is handled as the normal end.

In the above-mentioned case, the transfer of the dummy substrate D is prioritized, into the process chamber PM1 into which the product substrates A1 to A4 are already transferred. However, it is also acceptable to prioritize the transfer of the product substrates B1 to B3 into the process chamber PM2 into which the transfer is already started. Thereafter, the product substrates B4, B5 are transferred into the process chamber PM2, and one dummy substrate D is transferred into the process chamber PM1, which are respectively subjected to substrate processing. Thus, a labor of recovering the product substrates B1 to B3 in the carrier cassette CA1 once can be eliminated, and the transfer of all product substrates can be preferentially ended, and therefore the throughput can be improved.

As described above, in this embodiment, the production list is re-created as needed during fallback operation. Thus, the shortage of the number of substrates required for the collective processing can be prevented.

As described above, a conventional art involves a problem that the error is generated during transfer of the substrate based on the fallback operation, and when the substrate during transfer is disconnected and stay at a prescribed position in the substrate processing apparatus, the shortage is generated in the number of substrate required for the collective processing in some cases. If the substrate processing is performed in a state that the free space is generated on the substrate placing piece, unnecessary film formation, etc., is applied to the substrate placing piece, thus having an adverse influence on the substrate processing thereafter on this substrate placing piece. In this case, there is no choice but perform an abnormal stop of the substrate processing.

However, in this embodiment, when the shortage is generated in the number of substrate required for the collective processing, the production list can be re-created. Thus, the shortage can be filled with the dummy substrate, and therefore the shortage can be prevented from generating in the number of substrates, and the substrate processing can be continued without generating the free space on the substrate placing piece. Therefore, the transfer in the substrate processing apparatus 10 is continued while suppressing the adverse influence on the substrate processing, and the production efficiency can be improved.

(6) Effect of this Embodiment

According to this embodiment, one or a plurality of effects shown below can be exhibited.

(a) According to this embodiment, when the error is generated at a prescribed place in the substrate processing apparatus 10 during transfer of a prescribed number of substrate W into the process chambers PM1, PM2, the transfer line controller 239t performs control to make the substrate W that positioned at a prescribed place of the substrate processing apparatus 10 including the abnormal generation place stay at this position, and transfer a prescribed number of substrate W based on the fallback operation for continuing the substrate processing at a normal place. Thus, even if the error is generated during transfer of the substrate W, and the substrate W stays at a prescribed position in the substrate processing apparatus 10 based on the fallback operation, the generation of the free space is prevented on the substrate placing piece on which a prescribed number of substrate W is placed, and in this state, the substrate processing can be continued. Therefore, the productivity of the substrate processing apparatus 10 can be improved.

(b) Further, according to this embodiment, when the error is generated in any one of the gate valves PGV1, PGV2, LGV1, LGV2 coupled to the vacuum transfer chamber TM, during transfer of a prescribed number of substrate W into the process chambers PM1, PM2, under control of the transfer line controller 239t, the substrate W positioned at a prescribed place of the substrate processing apparatus 10 including the error generation place stays at this position, and the substrate W is withdrawn into the carrier cassette after the pressure at least in the process chambers PM1, PM2, and in the vacuum transfer chamber TM, reaches a prescribed pressure value. Thus, even in a case that the substrate processing is not continued, the substrate W in the substrate processing apparatus 10 can be speedily withdrawn, and the downtime of the substrate processing apparatus 10 can be shortened.

(c) Further, according to this embodiment, the transfer line controller 239t performs control to select the fallback operation table in which a different transfer procedure is defined according to the attribute of the substrate showing the processing status of the substrate W in each place where the error is generated, and transfer the substrate W based on such a fallback operation table. Thus, the substrate processing and the transfer of the substrate W during the fallback operation can be efficiently performed.

(d) Further, according to this embodiment, the transfer line controller 239t is configured to specify the number of the unprocessed substrate W, and when the shortage is generated in the number of the substrate required for the collective processing, use the filler dummy substrates for filling the shortage and re-create the production list to obtain a prescribed number of the substrate W. Thus, even if the error is generated during transfer of the substrate W and the substrate W stays at a disconnected position based on the fallback operation, the substrate processing can be continued without generating the shortage in the number of the substrate required for the collective processing.

<Second Embodiment of the Present Invention>

A second embodiment of the present invention will be described hereafter.

In this embodiment, a transfer system of the dummy substrate can be set, in a case of using the filler dummy substrate for filling the shortage. Namely, in the conventional technique, the transfer system of the dummy substrate is previously determined as the forward placing system, etc., in which the product substrate is placed from a head position of a plurality of substrate placing pieces for example, and the shortage is filled with the dummy substrate, and the operator cannot freely select the transfer system.

However, a slight difference is sometimes generated in the substrate processing characteristic, due to a different degree of consumption, etc., in the substrate placing piece among the plurality of substrate placing pieces for example.

Therefore, in this embodiment, the product substrate is preferentially disposed on the substrate placing piece on which particularly excellent substrate processing characteristic can be obtained, by suitably indicating the arrangement of the dummy substrate in the process chambers PM1, PM2 by setting the transfer system, etc., of the dummy substrate, or a monitor substrate is surely disposed on the substrate placing piece whose characteristic confirmation is required.

(1) Parameter for the Dummy Substrate

Setting of a parameter for the dummy substrate transferred based on the transfer system, etc., of the dummy substrate according to this embodiment, will be described hereafter using FIG. 16. FIG. 16 is a view showing a parameter setting screen in which the parameter for the dummy substrate is set.

The parameter for the dummy substrate is provided in each process chamber PM1, PM2, and is readably stored in the memory unit provided in the main control part, so as to be referenced by the transfer line controller as the control unit, in the main control part as the apparatus controller having a structure similar to the structure of the above-mentioned embodiment. Further, the parameter for the dummy substrate is configured to be set individually in each process chamber PM1, PM2.

Specifically, as shown In FIG. 16, upper and lower stages respectively show the box of the parameter for the dummy substrate in each process chamber PM1, PM2 for example. As a display content, there are buttons for selecting the transfer system of the dummy substrate into each process chamber PM1, PM2 displayed on an upper side in each box, and a substrate placing piece list for indicating a prescribed substrate placing piece in each process chamber PM1, PM2 as a fixed position and a priority position displayed at a lower side in each box.

The transfer system of the dummy substrate includes the "product substrate forward placing system", a "product substrate backward placing system", and an "arbitrary indication system", and is configured to be capable of selecting any one of the transfer systems by the above-mentioned buttons. The "product substrate forward placing system" is the transfer system in which the product substrate is placed from the head of the substrate placing pieces (for example, ST11 and ST21) out of the substrate placing pieces ST11 to ST15 and ST21 to ST25 in each process chamber PM1,PM2, and the shortage is filled with the dummy substrate. The "product substrate backward placing system" is the transfer system in which the product substrate is placed from a rear of the substrate placing pieces (for example, ST15 to ST25) in each process chamber PM1, PM2, and the shortage is filled with the dummy substrate. The "arbitrary indication system" is the transfer system of designating an arbitrary substrate placing piece on which the dummy substrate is placed. In the figure, the "arbitrary indication system" is selected as the parameter for the dummy substrate in the process chamber PM1. Further, the "product substrate backward placing system" is selected as the parameter for the dummy substrate in the process chamber PM2.

Further, the substrate placing piece designated as a fixed position on which the dummy substrate is placed every time the substrate processing is performed, can be arbitrarily set in the substrate placing piece list displayed in a table form. The fixed position can be designated by checking the check boxes (by a tick mark) of specific substrate placing pieces ST11 to ST15 and ST21 to ST25, out of the check boxes under an item of "(1) dummy fixture". In the figure, according to the parameter for the dummy substrate directed to the process chamber PM1, the substrate placing pieces ST11, ST13 are designated as the fixed positions of the dummy substrate. Further, according to the parameter for the dummy substrate directed to the process chamber PM2, the substrate placing pieces ST24, ST25 are designated as the fixed positions of the dummy substrate.

Further, the substrate placing piece designated as a priority position where the dummy substrate is preferentially placed during use of the filler dummy substrate for filling the shortage, can be automatically or arbitrarily set in the substrate placing list. The priority position can be designated by inputting the attribute of the substrate showing a priority order of the dummy substrate such as "dummy priority No. 1", "dummy priority No. 2" . . . , etc., in an order from the substrate placing piece on which the dummy substrate is placed with high priority, in each column of the item of "(2) dummy priority No." for example. At this time, for example when the "product substrate forward placing system" is selected, the attribute of the dummy substrate is automatically inputted so that the head substrate placing piece side is highly prioritized. Moreover, for example when the "product substrate backward placing system" is selected, the attribute of the dummy substrate is automatically inputted so that the rear substrate placing piece side is highly prioritized. In addition, when the "arbitrary indication system" is selected, the attribute of the dummy substrate can be inputted in an arbitrary priority order. In any case, the priority position is not designated on the substrate placing piece designated as the fixed position. Further, the indication of the priority position can be canceled by newly re-designating the priority position.

In the figure, according to the parameter for the dummy substrate directed to the process chamber PM1, the priority position of the substrate placing piece which is not designated as the fixed position, is arbitrarily designated in the priority order of the substrate placing pieces ST15, ST12, and ST14. Also, according to the parameter for the dummy substrate directed to the process chamber PM2, the priority position of the substrate placing piece designated as the fixed position is automatically designated in the priority order of the substrate placing pieces ST23, ST22, and ST21.

The transfer line controller is configured to perform transfer of the substrate W based on the parameter for the dummy substrate configured as described above. Thus, in the plurality of substrate placing pieces ST11 to ST15 and ST21 to ST25 provided in each process chamber PM1, PM2, the arrangement of the product substrate, the monitor substrate, and the dummy substrate can be freely combined, and operability of the substrate processing can be improved. Further, the substrate processing piece having an excellent substrate processing characteristic can be preferentially used for the processing of the product substrate, and confirmation of the characteristic can be efficiently performed by the monitor substrate, and the substrate processing characteristic can be improved as a whole.

Figure 17:
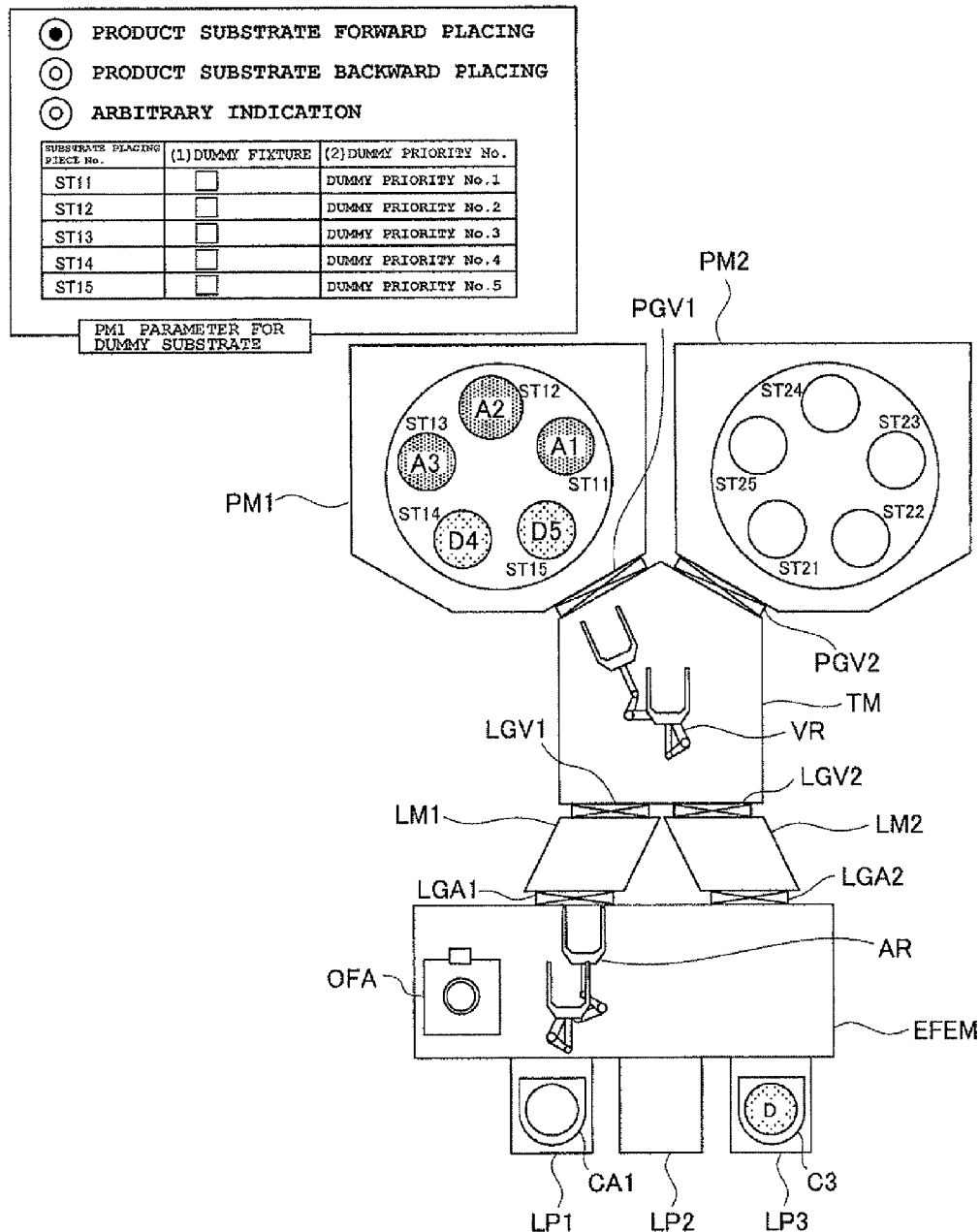
FIG. 17 is a view showing a state of performing a transfer of a substrate using a dummy substrate by the control unit according to the second embodiment of the present invention, based on "a product substrate forward placing system".
Figure 18:
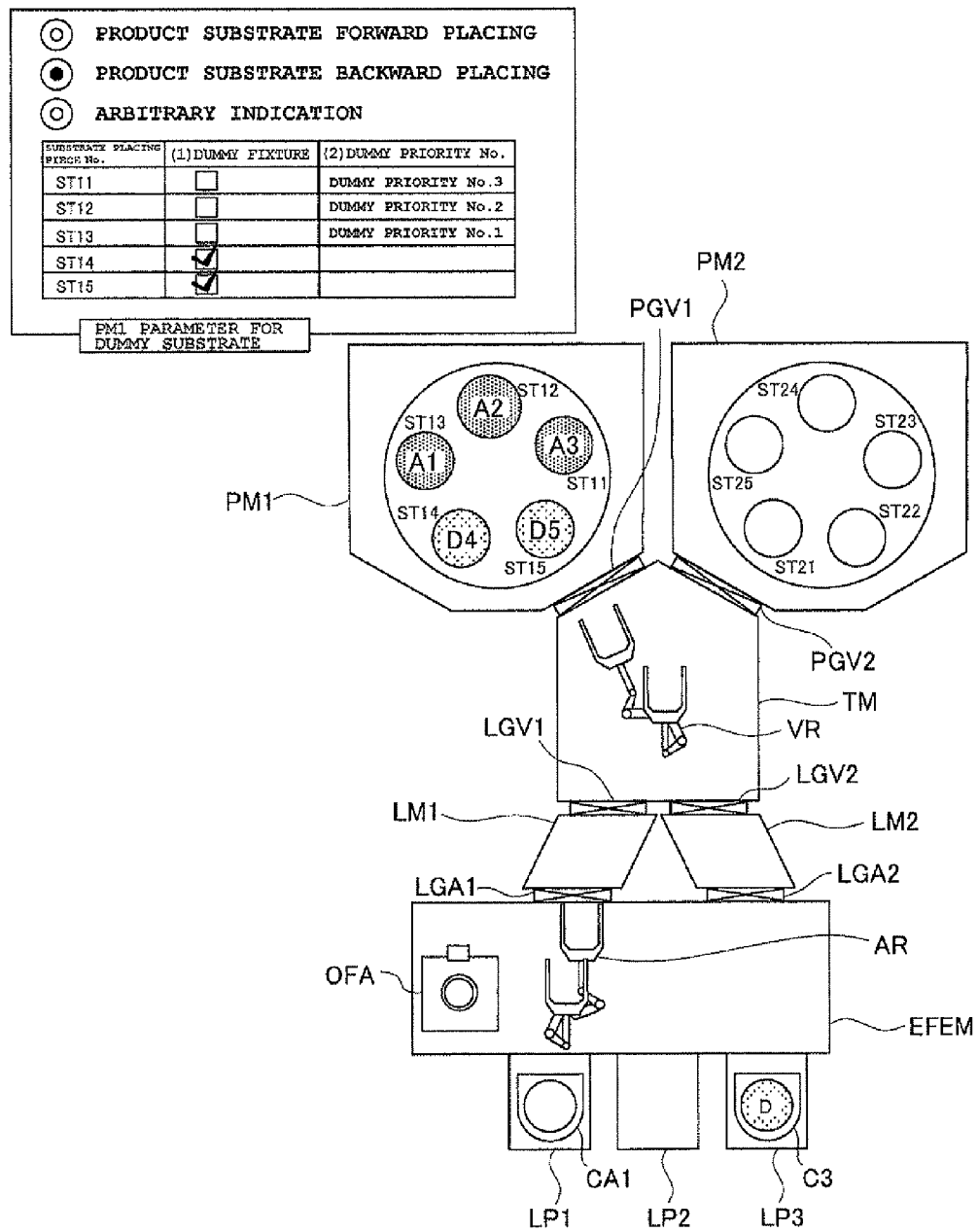
FIG. 18 is a view showing a state of performing the transfer of the substrate using the dummy substrate, by the control unit according to the second embodiment of the present invention, based on a "product substrate backward placing system".
Figure 19:
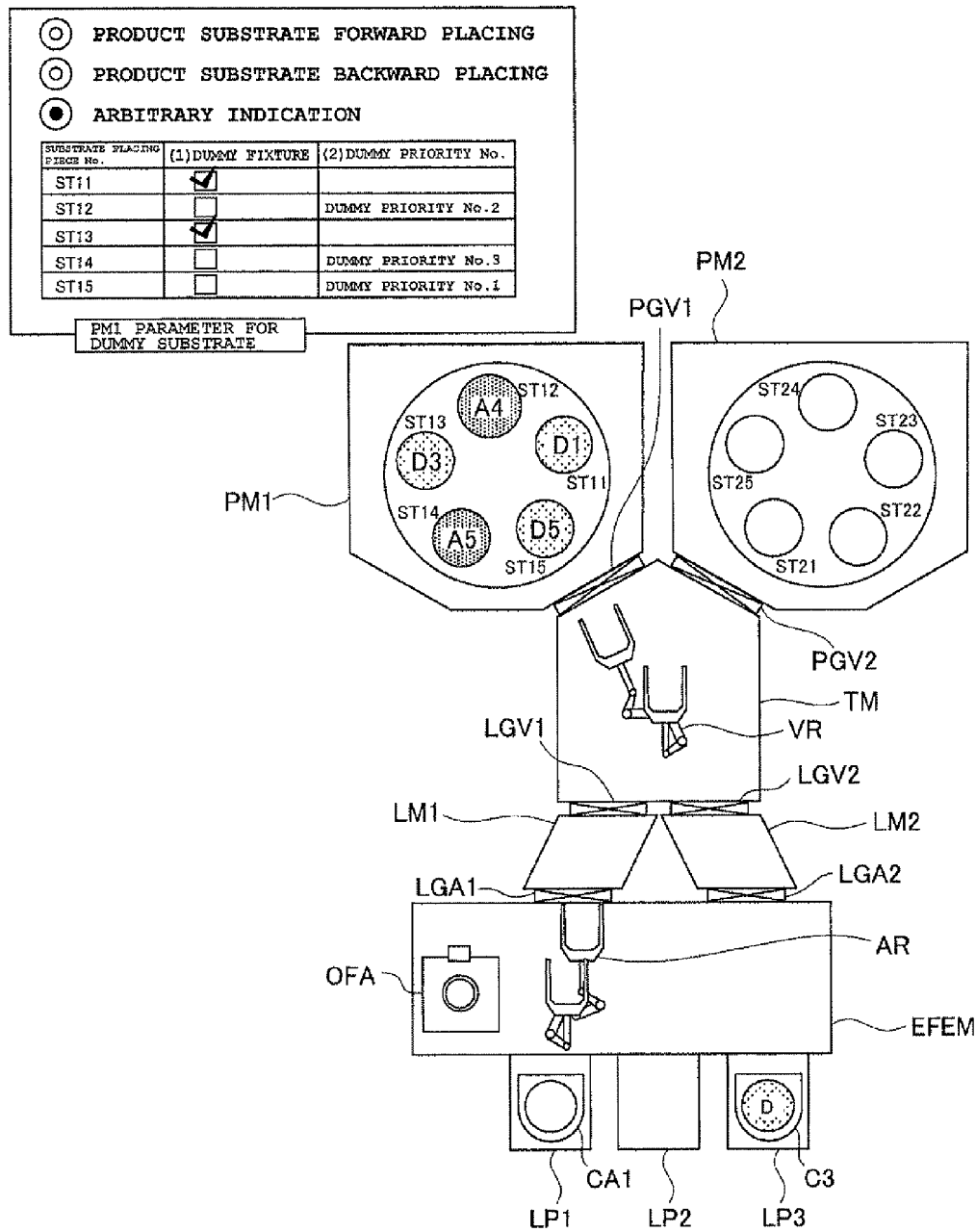
FIG. 19 is a view showing a state of performing the transfer of the substrate using the dummy substrate by the control unit according to the second embodiment of the present invention, based on an "arbitrary indication system".

(2) Operation of the Substrate Processing Apparatus Based on the Parameter for the Dummy Substrate The operation of the substrate processing apparatus based on the parameter for the dummy substrate will be described next, using FIG. 17 to FIG. 19. FIG. 17 to FIG. 19 are views showing a state that the transfer of the substrate is performed by the transfer line controller of this embodiment, using the dummy substrate, based on the "product substrate forward placing system", the "product substrate afterward placing system", and the "arbitrarily indication system" respectively.

(Operation Based on the Product Substrate Forward Placing System)

The operation based on the "product substrate forward placing system" shown in FIG. 17 will be described first. In FIG. 17, no one of the substrate placing pieces ST11 to ST15 is designated as the fixed position. Further, the priority position is automatically designated in each one of the substrate placing pieces ST11 to ST15, so that the head substrate placing piece side is highly prioritized.

For example when the transfer line controller performs control so that for example three product substrates A1 to A3 are transferred based on the parameter for the dummy substrate set as described above, the product substrates A1 to A3 are sequentially placed on the head of the substrate placing piece ST11 to the third substrate placing piece ST13, and the shortage of the substrate placing pieces ST14, ST15 are filled with the dummy substrates D4, D5 as shown in FIG. 17.

(Operation Based on the Product Substrate Backward Placing System)

Subsequently, the operation based on the "product substrate backward placing system" shown in FIG. 18 will be described. The parameter for the dummy substrate of FIG. 18 is set similarly to a case of the "product substrate backward placing system" shown in FIG. 16, excluding a point that the parameter is directed to the process chamber PM1 instead of the process chamber PM2.

When the transfer line controller transfers three product substrates A1 to A3 based on the "product substrate backward placing system", the product substrates A1 to A3 are placed sequentially from the rear substrate placing piece ST15 side. However, in FIG. 18, the substrate placing pieces ST15, ST14 are designated as fixed positions, and the dummy substrates D5, D4 are respectively placed on the substrate placing pieces ST15, ST14 during substrate processing. Accordingly, the product substrates A1 to A3 are placed sequentially from a rear substrate placing piece ST13 to a head substrate placing piece ST11 out of the remaining substrate placing pieces ST11 to ST13.

(Operation Based on the Arbitrary Indication System)

The operation based on the "arbitrary indication system" shown in FIG. 19 will be described next. The parameter for the dummy substrate of FIG. 19 is set similarly to the case of the "arbitrary indication system" shown in FIG. 16.

When the transfer line controller transfers five product substrates A1 to A5 for example, based on the parameter for the dummy substrate which is set as described above, the dummy substrate is placed every time on the substrate placing pieces ST11, ST13 designated as the fixed positions during substrate processing. Accordingly, the product substrates A1 to A5 are processed twice.

Specifically, in a first processing, the dummy substrates D1, D3 are respectively placed on the substrate placing pieces ST11, ST13, and the product substrates A1 to A3 are respectively placed on the other substrate placing pieces ST12, ST14, ST15. In this state, the substrate processing is performed. In order to place the remaining product substrates A4, A5 on a prescribed substrate placing piece in a second processing, the dummy substrates D1, D3, D5 are respectively placed on the substrate placing pieces ST11, ST13 designated as the fixed positions, and on the substrate placing piece ST15 on which the dummy substrate is placed with high priority, and the product substrates A4, A5 are respectively placed on the other substrate placing pieces ST12, ST14.

(3) Re-Creation of the Production List

In this embodiment as well, the re-creation of the production list is performed by the transfer line controller as needed, when transfer of the substrate W is started and when the fallback operation is started during generation of the error. The re-creation of such a production list will described using FIG. 20 to FIG. 25.

Figure 20:
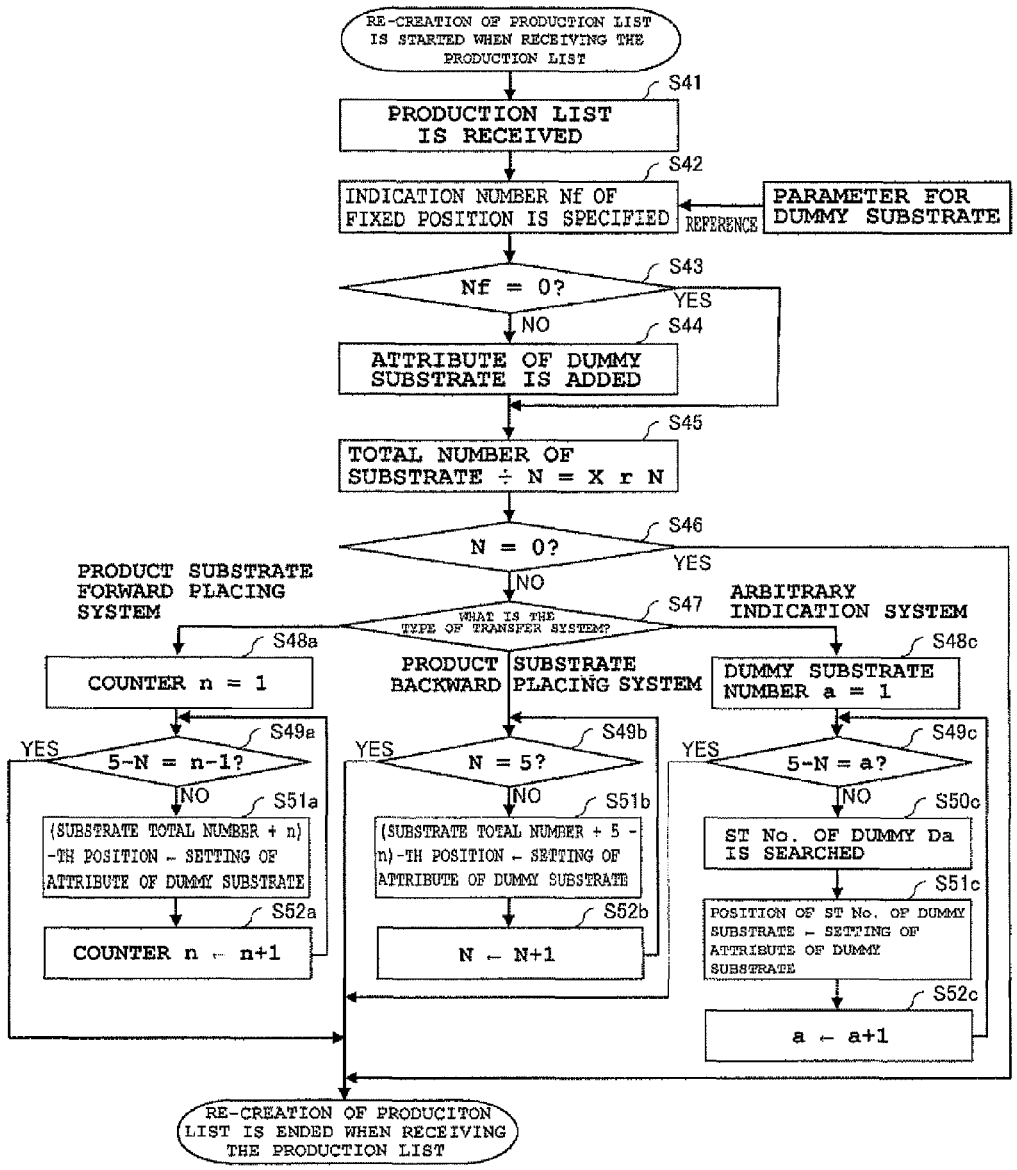
FIG. 20 is a flowchart of the re-creation of the production list which is performed by the control unit according to the second embodiment of the present invention, when the production list is received from the host computer.

FIG. 20 is a flowchart of the re-creation of the production list performed by the transfer line controller of this embodiment when the production list is received from the host computer 237 as shown in FIG. 2. FIG. 21 is an explanatory view of the re-creation of the production list performed by the transfer line controller of this embodiment when the production list is received from a host computer. FIG. 22 to FIG. 25 are views showing the state of the fallback operation of the substrate processing apparatus of this embodiment at every place where the error is generated. In the following explanation as well, the operation of each part of the substrate processing apparatus is controlled by the main control part.

(Re-Creation of the Production List)

As shown in FIG. 20, the main control part as an apparatus controller receives the production list from the host computer such as the host computer 237, and stores it in the memory unit (S41). The transfer line controller executes the creation program of the production list, to thereby reference the parameter for the dummy substrate, and specifies the number Nf required to be added as the dummy substrate at the fixed position, from the number of substrate placing pieces designated as the fixed positions (S42). When Nf is not zero (S43→NO), the attribute of the Nf dummy substrate is added at a position in the production list corresponding to the substrate placing piece designated as the fixed position, and the number obtained by adding Nf to the total number of product substrate is set as the total number of the substrate (S44). When Nf is zero (S43→YES), processing is advanced to the next step without performing S44.

Next, the transfer line controller judges whether the filler dummy substrate should be used for filling the shortage, from the information obtained from the above-mentioned production list. Namely, the number of the substrate W in the production list including the dummy substrate at the fixed positions is divided by the number of the substrate "5" required for the collective processing in either the process chamber PM1 or the process chamber PM2 (S45), to thereby obtain the quotient X and the remainder N. When the remainder N is zero, the quotient X is set as the number of times required for the substrate processing, and it is so judged that the filler dummy substrate is not required for filling the shortage (S46→YES), and the flow of the re-creation of the production list is ended. When the quotient N is not zero, (X+1) is set as the number of times required for the substrate processing, and it is so judged that the filler dummy substrate should be used for filling the shortage (S46→NO), and the following flow of re-creating the production list is performed according to the type of the transfer system of the dummy substrate (S47).

When the "product substrate forward placing system" is selected, the counter n is set to 1 by the transfer line controller (S48a). Next, the attribute of the dummy substrate is set at (total number of substrate+n)-th position in the production list (S51a), and the counter n is advanced by 1 (S52a). Thereafter, S51a and S52a are repeated until the number of setting the attribute of the dummy substrate reaches the number (5-N) of the filler dummy substrate required for filling the shortage (S49a).

When the "product substrate backward placing system" is selected, the transfer line controller sets the attribute of the dummy substrate at (total number of substrate+(5-N))-th position in the production list (S51b), and increases N by 1 (S52b). Thereafter, S51b and S52b are repeated until N becomes "5" (S49b).

When the "arbitrary indication system" is selected, dummy substrate number "a" is set to 1 ("a" is a constant) by the transfer line controller (S48c). Next, the number search is performed, for the number of the substrate placing piece (ST No.) to which the dummy substrate Da of the dummy substrate number "a" is assigned (S50c), and the attribute of the dummy substrate is set at a position corresponding to such ST No. in the production list (S51c), and the dummy substrate number "a" is increased by 1 (S52c). Thereafter, S51c and S52c are repeated until "a" becomes (5-N) (S49c).

As described above, the flow of the re-creation of the production list is ended.

FIG. 21 shows an example of the production list re-created by the above-mentioned flow. A process recipe name is set, which is "recipe A" to define the used process chamber (for example, PM1) and a content of the substrate processing, and attributes of five product substrates are defined at positions of No. 1 to No. 5, in the production list received by the main control part in the upper stage of FIG. 21.

The transfer line controller re-creates the received production list as shown in the lower stage of FIG. 21, based on the above-mentioned flow. When the "product substrate forward placing system" is selected and the substrate placing piece ST13 is selected as the fixed position in the parameter for the dummy substrate, the attribute of the dummy substrate is added at positions No. 3 and No. 8 in the production list corresponding to the substrate placing piece designated as the fixed position. Further, the total number of the substrate W is (5+2)÷5=1 r 2 after addition of the dummy substrate, and therefore the number of times required for the substrate processing is (1+1) times, and the number of the filler dummy substrate for filling the shortage is (5-2). Accordingly, the attributes of three dummy substrates are added at positions No. 7, No. 9, and No. 10 in the production list.

Thus, when the flow of the re-creation of the production list is ended, the transfer line controller starts the transfer of the substrate W including the dummy substrate and the product substrate, based on the production list.

Further, the transfer line controller performs the re-creation of the production list as needed when the fallback operation is started during generation of the error. The flow at this time is approximately the same as the flow at the time of starting the transfer of the substrate W. Namely, when the error is generated, the attribute of the dummy substrate at the fixed position is added to the attribute of the unprocessed substrate W, to thereby obtain the total number of the substrate, and the flow of S45 and thereafter the flow of FIG. 20 are performed to the total number of the substrate. Thus, the production list is obtained, by further re-creating the production list in the lower stage of FIG. 21.

Explanation is given hereafter for several patterns of the processing of the substrate W and the procedure of transferring the substrate when the re-creation of the production list is required.

(A Case that the Error Place is the Process Chamber)

Figure 22:
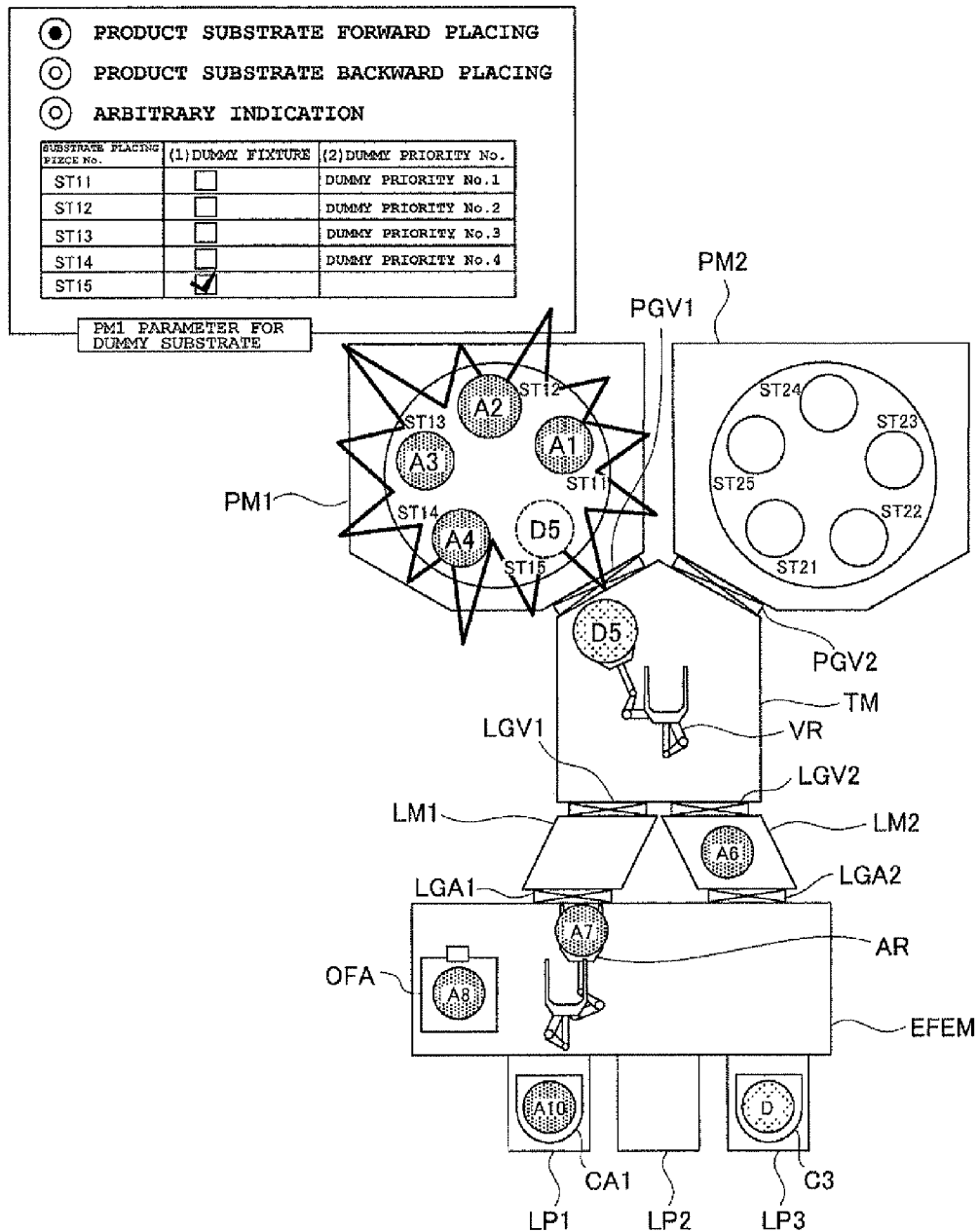
FIG. 22 is a view showing a state of the fallback operation in a case of processing the substrate including the dummy substrate, when error is generated in any one of the process chambers of the substrate processing apparatus according to the second embodiment of the present invention.
Figure 23:
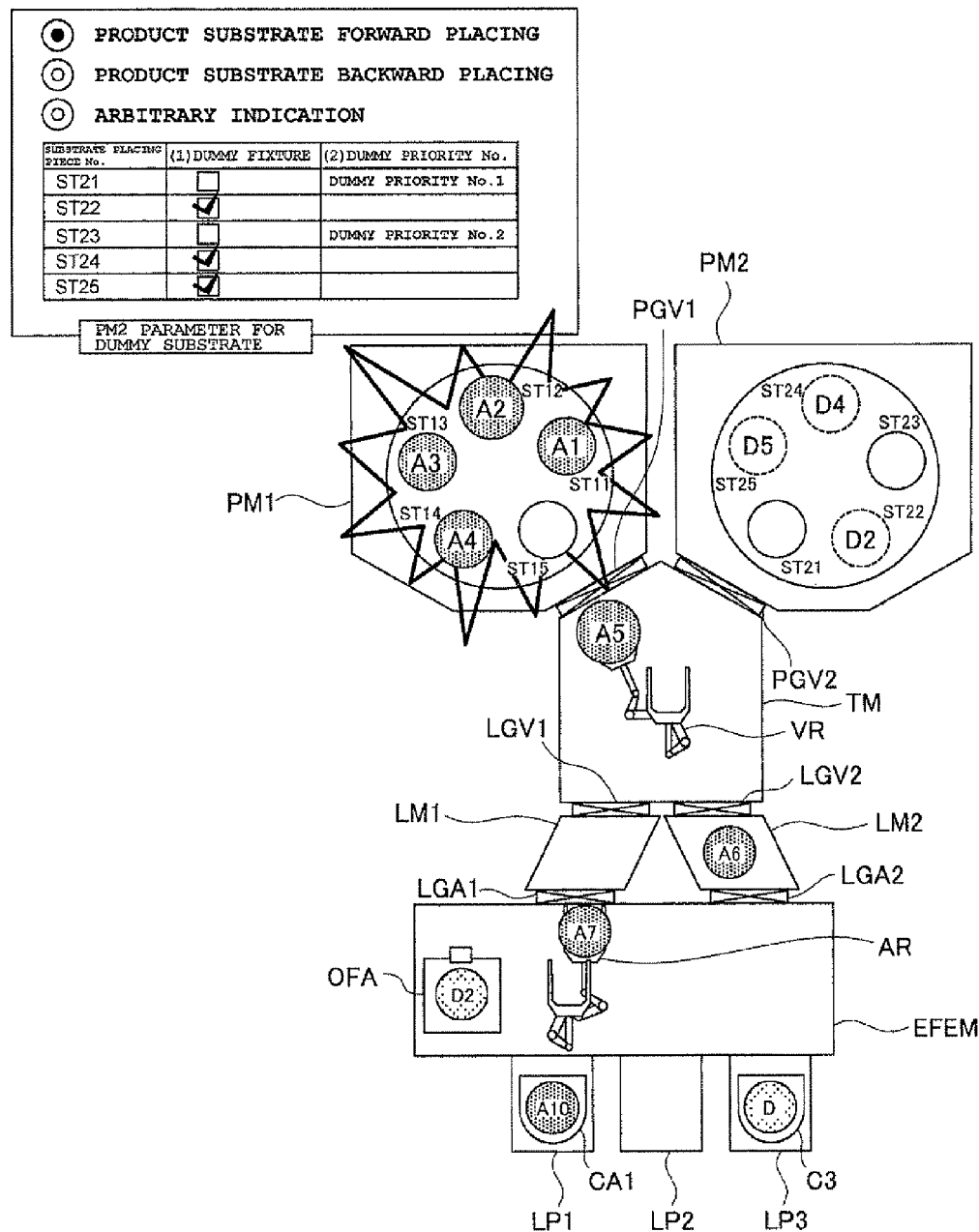
FIG. 23 is a view showing a state of the fallback operation in a case of processing the substrate including the dummy substrate, when error is generated in any one of the process chambers of the substrate processing apparatus according to the second embodiment of the present invention.

First, using FIG. 22 and FIG. 23, explanation is given for a case that the error is generated in either the process chamber PM1 or the process chamber PM2, when a prescribed substrate placing piece is designated as the fixed position and the substrate W is transferred based on the "product substrate forward placing system" and is processed.

In FIG. 22, the carrier cassette CA1 in which the lot A having nine product substrates A1 to A4, A6 to A10 are housed, is placed on the load port LP1. In addition, in the process chamber PM1, the "product substrate forward placing system" is selected, and only the substrate placing piece S15 is designated as the fixed position. The content of the initial production list is that the product substrates A1 to A4 and the dummy substrate D5 at the fixed position are processed in the process chamber PM1, and the product substrates A6 to A10 are processed in the process chamber PM2. Further, the error is generated in the process chamber PM1 into which unprocessed product substrates A1 to A4 are transferred, during transfer of the unprocessed dummy substrate D5 into the vacuum transfer chamber TM from the load lock chamber LM1 based on the above-mentioned production list. In addition, unprocessed product substrates A6 to A8 are respectively transferred into the load lock chamber LM2, into the atmosphere transfer chamber EFEM, and on the orientation flat aligner OFA, based on the production list.

In the above-mentioned case, as a result of the stay of the product substrates A1 to A4 in the process chamber PM1, the total number of the remained unprocessed substrate W is six including the dummy substrate D5, thus generating the shortage in the number of the substrate. Therefore, the re-creation of the production list is performed by the transfer line controller, and the dummy substrate D5 and the product substrates A6 to A9 are transferred into the process chamber PM2 and are processed, and subsequently the product substrate A10 and four dummy substrates are transferred into the process chamber PM2 and are processed. The lot A is handled as the abnormal end.

FIG. 23 is described next.

In FIG. 23, the carrier cassette CA1 in which the lot A having ten product substrates A1 to A10 are housed, is placed on the load port LP1. Further, in the process chamber PM2, the "product substrate forward placing system" is selected, and substrate placing pieces S22, S24, and S25 are designated as the fixed positions. The content of the initial production list is that the product substrates A1 to A5 are processed in the process chamber PM1, and product substrates A6 to A7 and dummy substrates D2, D4, D5 are processed in the process chamber PM2, and product substrates A8 to A10 and two dummy substrates are processed in the process chamber PM1. Further, the error is generated in the process chamber PM1 into which the unprocessed product substrates A1 to A4 are also transferred, during transfer of the unprocessed product substrates A5 into the vacuum transfer chamber TM from the load lock chamber LM1 based on the production list. Further, unprocessed product substrates A6, A7 and the dummy substrate D2 are transferred into the load lock chamber LM2, into the atmosphere transfer chamber EFEM, and on the orientation flat aligner OFA respectively, based on the production list.

In the above-mentioned case, as a result of the stay of the product substrates A1 to A4 in the process chamber PM1, the product substrate A5 expected to be processed in the PM1 together with the product substrates A1 to A4 are remained, and a transfer order of the initial production list including the dummy substrate at the fixed position of the process chamber PM2 cannot be maintained. Therefore, the re-creation of the production list is performed by the transfer line controller, and product substrates A5, A6 are transferred into the process chamber PM2, and are respectively placed on the substrate placing pieces S21, S23 which are not designated as the fixed positions. Meanwhile, the product substrate A7 is withdrawn into the carrier cassette CA1 once. Subsequently, three dummy substrates including the dummy substrate D2 transfer of which is already started, are transferred into the process chamber PM2 and are placed on substrate placing pieces S22, S24, S25 which are designated as the fixed positions. These dummy substrates are processed together with the product substrates A5, A6, and are respectively returned to the dummy carrier C3 and the carrier cassette CA1, and thereafter the product substrate A7 is re-transferred into the process chamber PM2, and further the product substrate A8 and three dummy substrates at the fixed positions are newly transferred, which are then subjected to substrate processing. Thereafter, product substrates A9, A10 and three dummy substrates are transferred and are subjected to substrate processing collectively. The lot A is handled as the abnormal end.

(A Case that the Error Place is the Load Lock Chamber)

Subsequently, using FIG. 24 and FIG. 25, explanation is given for a procedure when the error is generated in either the load lock chamber LM1 or the load lock chamber LM2, when a prescribed substrate placing piece is designated as the fixed position, and the substrate W is transferred based on the "product substrate forward placing system" and is subjected to substrate processing.

Figure 24:
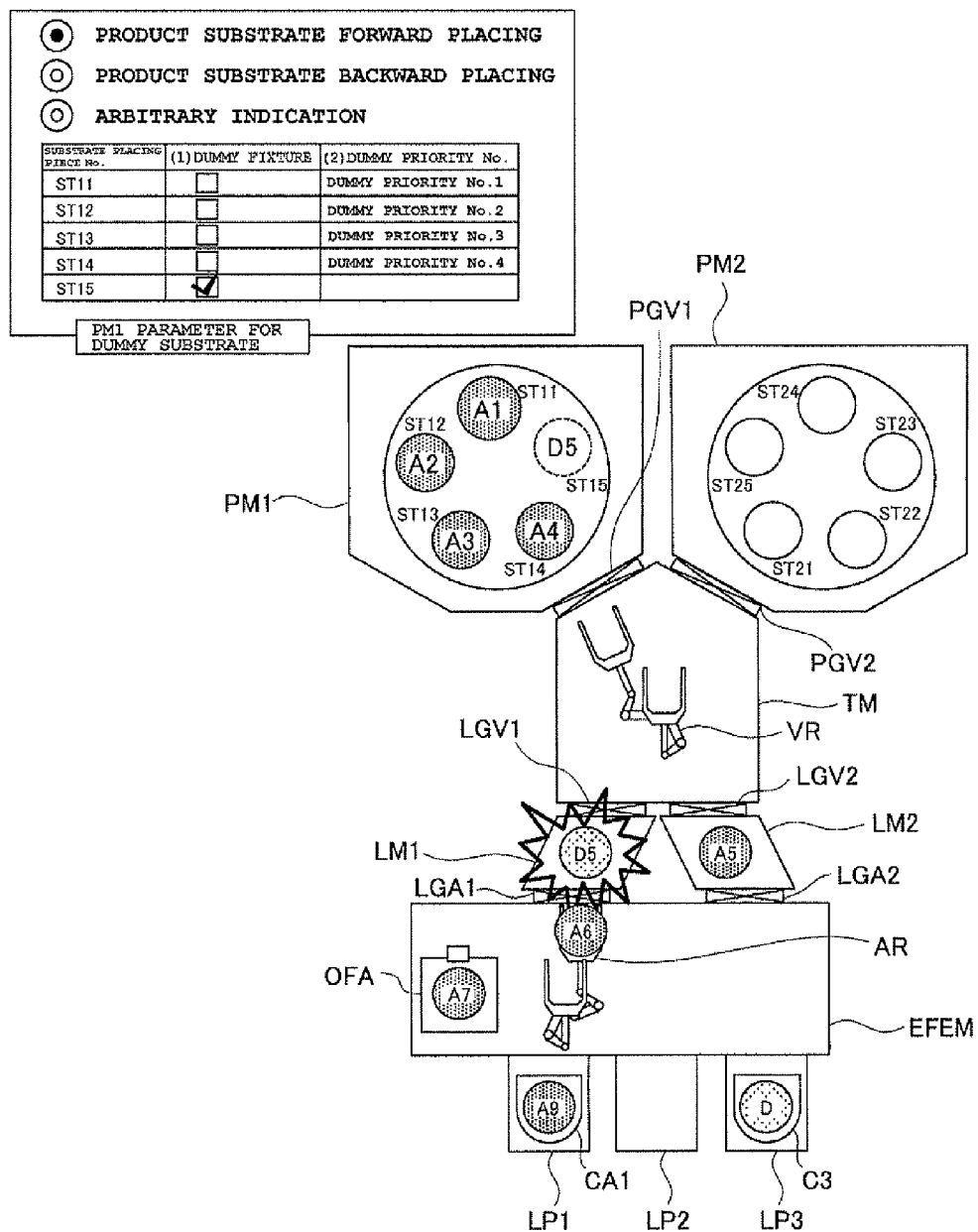
FIG. 24 is a view showing a state of the fallback operation in a case of processing the substrate including the dummy substrate, when error is generated in any one of the process chambers of the substrate processing apparatus according to the second embodiment of the present invention.

In FIG. 24, a content of setting the parameter for the dummy substrate such as the transfer method and the fixed position, etc., are the same as those of FIG. 22, excluding a point that the lot A has nine product substrates of A1 to A9. The content of the initial production list is that the product substrates A1 to A4 and the dummy substrate D5 at the fixed position are processed in the process chamber PM1, and the product substrates A5 to A9 are processed in the process chamber PM2. Further, the error is generated in the load lock chamber LM1 into which the unprocessed dummy substrate D5 is transferred, during transfer of the unprocessed product substrate A4 into the process chamber PM1 into which unprocessed product substrates A1 to A3 are transferred from the vacuum transfer chamber TM based on the-above mentioned production list. In addition, the unprocessed product substrates A5 to A7 are transferred into the load lock chamber LM2, into the atmosphere transfer chamber EFEM, and on the orientation flat aligner OFA respectively based on the production list.

In the above-mentioned case, the load lock chamber LM1 is disconnected based on the fallback operation, and the dummy substrate D5 stays in the load lock chamber LM1. As a result, other dummy substrate needs to be transferred to the substrate placing piece S15 designated as the fixed position, and the transfer thereafter needs to be performed through the load lock chamber LM2. Therefore, the production list is re-created by the transfer line controller, and the product substrates A5 to A7 are withdrawn into the carrier cassette CA1 once. Subsequently, a new dummy substrate is transferred into the process chamber PM1 through the load lock chamber LM2, which is then placed on the substrate placing piece S15 designated as the fixed position, and is processed together with the product substrates A1 to A4. Meanwhile, the product substrates A5 to A7 are re-transferred into the process chamber PM2 through the load lock chamber LM2, and the product substrates A8, A9 are newly transferred and the substrate processing is performed thereto. The lot A is handled as the abnormal end. The transfer of the product substrates A5 to A7, etc., whose transfer is already started, may be prioritized, so as to be transferred to the process chamber PM2 of the product substrates A5 to A7, etc., prior to the transfer of the new dummy substrate.

Figure 25:
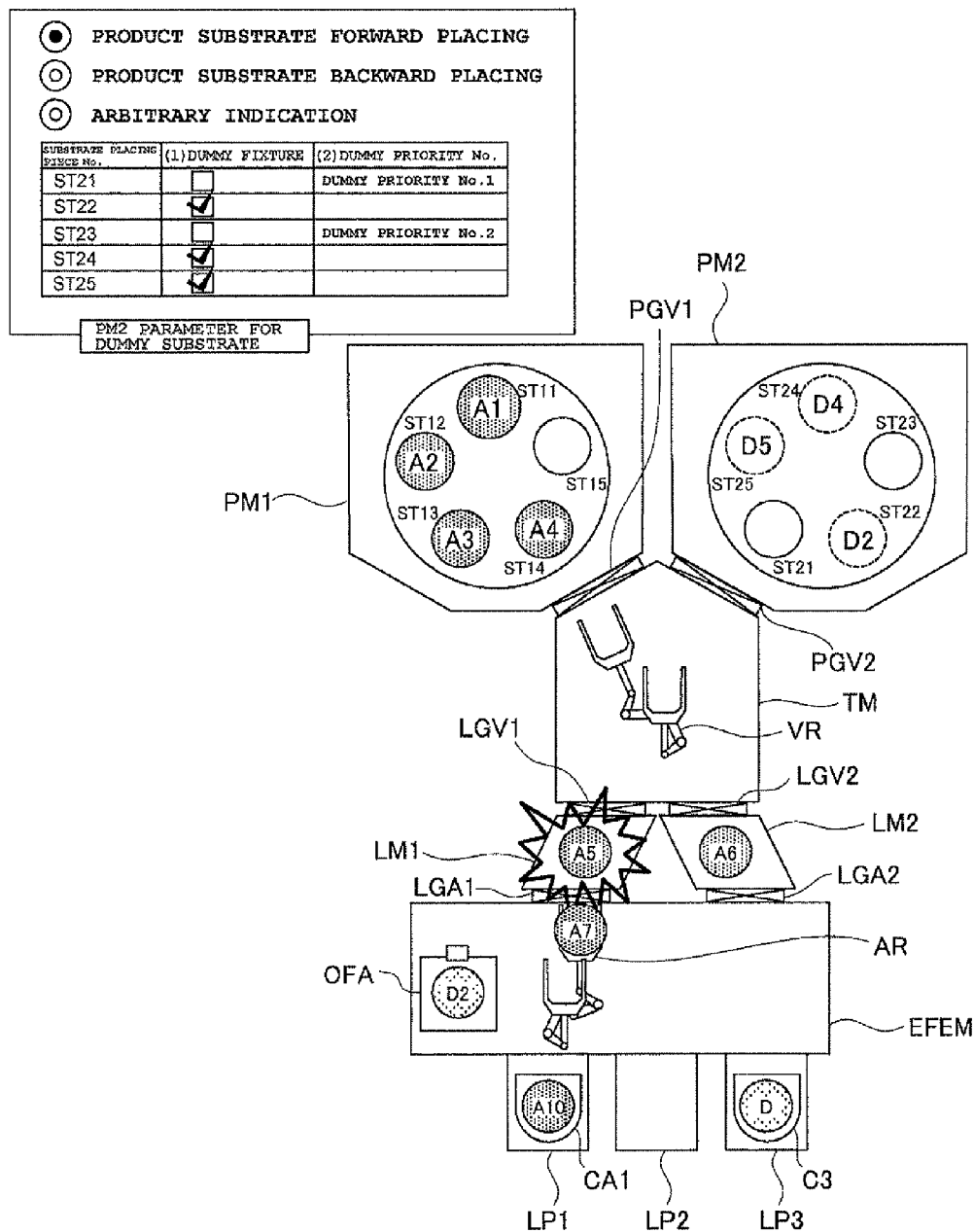
FIG. 25 is a view showing a state of the fallback operation in a case of processing the substrate including the dummy substrate, when error is generated in any one of the load lock chambers of the substrate processing apparatus according to the second embodiment of the present invention.

FIG. 25 is described next.

In FIG. 25, details of the product substrate to be processed, setting of the parameter for the dummy substrate such as the transfer system and the fixed position, etc., and the content of the production list are the same as those of a case of FIG. 23. Further, in FIG. 25, the error is generated in the load lock chamber LM1 into which the unprocessed product substrate A5 is transferred, during transfer of the unprocessed product substrate A4 from the vacuum transfer chamber TM into the process chamber PM1 into which the unprocessed product substrates A1 to A3 are transferred, based on the production list. In addition, the unprocessed product substrates A6, A7 and the dummy substrate D2 are transferred into the load lock chamber LM2, into the atmosphere transfer chamber EFEM, and on the orientation flat aligner OFA respectively, based on the production list.

In the above-mentioned case, the load lock chamber LM1 is disconnected based on the fallback operation, and the product substrate A5 stays in this process chamber PM1. As a result, the transfer thereafter must be performed through the load lock chamber LM2, and the transfer order of the initial production list including the dummy substrate at the fixed position cannot be maintained. Therefore, the production list is re-created by the transfer line controller, and the product substrate A6 is transferred into the process chamber PM1 and is processed together with the product substrates A1 to A4, and subsequently, the product substrate A7 and the dummy substrate D2 are transferred into the process chamber PM2, which are then placed on the substrate placing piece S21 and on the substrate placing piece S22 designated as the fixed position respectively, and further the product substrate A8 and other two dummy substrates are transferred and placed on the substrate placing piece S23 and the substrate placing pieces S24, S25 designated as the fixed positions respectively, and are collectively processed. After such a substrate processing is ended, the product substrates A9, A10 and three dummy substrates at the fixed positions are transferred into the process chamber PM2 and are processed. It is also acceptable that by utilizing a free time of the load lock chamber LM2 generated under process of the product substrates A7, A8, etc., in the process chamber PM2, the product substrates A9, A10 and three filler dummy substrates for filling the shortage are transferred into the process chamber PM1, and the processing is performed thereto in parallel to the processing in the process chamber PM2. The lot A is handled as the abnormal end.

(4) Effect of this Embodiment

According to this embodiment, one or a plurality of effects shown below can be exhibited, in addition to an effect similar to the above-mentioned embodiment.

(a) According to this embodiment, the transfer system of the dummy substrate out of any one of the "product substrate forward placing system", the "product substrate backward placing system", and the "arbitrary indication system", is set. Thus, the transfer order of the substrate W including the dummy substrate and the product substrate can be more flexibly designated and the production list is re-created, to thereby improve the operability of the substrate processing apparatus. Further, the substrate placing piece having an excellent substrate processing characteristic is preferentially used for the processing of the product substrate, and a characteristic confirmation using a monitor substrate is efficiently executed, to thereby make it easy to improve and maintain the substrate processing characteristic.

(b) Further, according to this embodiment, the substrate placing piece is set, so as to be designated as the fixed position and the priority position. Thus, the dummy substrate can be placed on a prescribed substrate placing piece every time the substrate processing is performed, and the dummy substrate can be preferentially placed on a prescribed substrate placing piece during filling the shortage with the dummy substrate, to thereby further flexibly designate the transfer order of the substrate W including the dummy substrate and the product substrate, and the arrangement thereof in the process chambers PM1, PM2.

<Other Embodiment of the Present Invention>

As described above, the embodiment of the present invention is specifically described. However, the present invention is not limited to the above-mentioned embodiment, and can be variously modified in a range not departing from the gist of the invention.

For example, in the above-mentioned embodiment, explanation is given for a case that the content of the substrate processing in the substrate processing apparatus 10 is mainly composed of the film formation processing. However, the content of the substrate processing is not limited thereto, and may be etching, etc., for example.

Thus, the present invention can be applied to a case that the film formation processing is performed for forming various films such as an oxide film, a nitride film, and a metal film, etc., by a CVD (Chemical Vapor Deposition) method, an ALD (Atomic Layer Deposition) method, and a PVD (Physical Vapor Deposition) method, and can also be applied to a case that other processing is performed, such as etching, dispersing, annealing, oxidizing, and nitriding, etc. In addition, the present invention can also be applied to a case that the dummy substrate is used not only for the substrate processing, but also for cleaning and conditioning of the inside of the processing furnace 202. Further, the present invention can also be applied to an etching apparatus, an annealing apparatus, an oxidizing apparatus, a nitriding apparatus, a coating apparatus, a drying apparatus, and a heating apparatus, etc., other than a thin film forming apparatus.

Further, the present invention can be applied not only to a semiconductor manufacturing apparatus, etc., for processing a substrate such as a semiconductor wafer like the substrate processing apparatus 10 of this embodiment, but also to a substrate processing apparatus such as an LCD (Liquid Crystal Display) manufacturing apparatus, etc., for processing a glass substrate.

Further, the present invention is not limited to a case that the operation part controller 236 is disposed in the substrate processing apparatus 10. For example, it is also acceptable that a body of the substrate processing apparatus is disposed in a clean room, and at least a part of the main control part is disposed in an office (on a different floor from the clean room), and a state of the substrate processing apparatus is monitored and analyzed remotely.

<Preferred Aspect of the Present Invention>

According to an aspect of the present invention, there is provided a substrate processing apparatus including:

a control unit that performs control so that a substrate including a dummy substrate and a product substrate is transferred into a process chamber, wherein the control unit performs control so that when error is generated in the process chamber during transfer of a prescribed number of the substrate into the process chamber, a substrate in the process chamber where the error is generated, stays in this process chamber, and a prescribed number of a substrate including other substrate scheduled to be transferred into the process chamber where the error is generated, is transferred to other process chamber where the error is not generated.

According to other aspect of the present invention, there is provided s substrate processing apparatus including:

a control unit that performs control so that a substrate including a dummy substrate and a product substrate is transferred into a process chamber from a housing vessel in which the dummy substrate or the product substrate is housed, through a preload chamber, wherein the control unit performs control so that when error is generated in the preload chamber during transfer of a prescribed number of the substrate into the process chamber, a substrate in the preload chamber where the error is generated stays in this preload chamber, and a prescribed number of the substrate including other substrate scheduled to be transferred into the process chamber, is transferred into the process chamber through other preload chamber where the error is not generated.

According to further other aspect of the present invention, there is provided a substrate processing apparatus including a control unit that performs control so that a substrate including a dummy substrate and a product substrate is transferred into a preload chamber under an atmospheric pressure from a housing vessel in which the dummy substrate or the product substrate is housed, and is transferred into a process chamber under a reduced pressure from the preload chamber through a transfer chamber, wherein when error is generated in any one of open/close valves for connecting the process chamber and the preload chamber to the transfer chamber during transfer of a prescribed number of the substrate into the process chamber, the substrate at least in the process chamber and the transfer chamber stays in this process chamber or this transfer chamber, and a pressure at least in the process chamber and the transfer chamber is increased to a prescribed pressure value, and the substrate is withdrawn into the housing vessel from the process chamber or the transfer chamber where the pressure reaches a prescribed pressure value.

According to further other aspect of the present invention, there is provided a substrate processing apparatus, including a control unit that performs control so that a substrate including a dummy substrate and a product substrate is transferred into a preload chamber under an atmospheric pressure from a housing vessel in which the dummy substrate or the product substrate is housed, and is transferred into a process chamber under a reduced pressure through the preload chamber, wherein when error is generated in an open/close valve at the housing vessel side of the preload chamber during transfer of a prescribed number of the substrate into the process chamber, the substrate in the preload chamber where the error is generated stays in this preload chamber, and a prescribed number of the substrate including other substrate scheduled to be transferred into the process chamber is transferred into the process chamber through other preload chamber where the error is not generated.

Preferably, there is further provided other control unit that performs control so that a prescribed number of the substrate is collectively processed in the process chamber.

Further preferably, the control unit performs control so that the substrate is transferred based on a production list in which an attribute of the substrate is defined showing at least a transfer order and a processing status of the substrate, and when the error is generated, the control unit performs control to:

specify the number of other substrate which has not undergone substrate processing yet;

re-create the production list so that when a shortage is generated in the number of a substrate required for a collective processing, the shortage is filled with a filler dummy substrate to obtain the prescribed number of substrate; and transfer at least a part of the substrate based on the re-created production list.

Further preferably, the control unit performs the transfer of the substrate using the dummy substrate by the control unit according to the second embodiment of the present invention, based on a parameter for a dummy substrate is set, out of any one of the systems such as:

a product substrate forward placing system in which the product substrate is placed from a head of the substrate placing pieces and a shortage is filled with the dummy substrate;

a product substrate backward placing system in which the product substrate is placed from a rear of the substrate placing pieces, and the shortage is filled with the dummy substrate; and an arbitrary indication system in which an arbitrary substrate placing piece is set, for placing the dummy substrate thereon.

According to further other aspect of the present invention, there is provided a fallback operation program, for executing:

a fallback operation of continuing at least a part of a transfer of a substrate by disconnecting a prescribed place of a substrate processing apparatus including a place where error is generated, when the error is generated during transfer of a prescribed number of the substrate into a process chamber, which is the program for executing the steps of:

specifying the place where the error is generated;

selecting a transfer procedure according to a processing status of the substrate in each place where the error is generated: and performing control to transfer the substrate based on the selected transfer procedure.

According to further other aspect of the present invention, there is provided a creation program of a production list executed by a substrate processing apparatus including a control unit that performs control to transfer a prescribed number of a substrate into a process chamber based on a production list in which an attribute of the substrate is defined showing least a transfer order and a processing status of the substrate including a dummy substrate and a product substrate, wherein the creation program causes the control unit to execute the steps of:

specifying the number of the substrate which has not undergone substrate processing yet; and when a shortage is generated in the substrate required for collective processing, re-creating the production list so that the shortage is filled with a filler dummy substrate to obtain a prescribed number of the substrate.

According to further other aspect of the present invention, there is provided a setting method of a parameter for a dummy substrate performed by a substrate processing apparatus which transfers a substrate including a dummy substrate and a product substrate into a process chamber, and collectively processes a prescribed number of the substrate in the process chamber, wherein a transfer system of the dummy substrate is set out of any one of a product substrate forward placing system in which the product substrate is placed from a head of substrate placing pieces which are provided in the process chamber and a shortage is filled with the dummy substrate;

a product substrate backward placing system in which the product substrate is placed from a rear of the substrate placing pieces and the shortage is filled with the dummy substrate; and an arbitrary indication system in which an arbitrary substrate placing piece is designated so that the dummy substrate is placed thereon.

Preferably, there are further provided the substrate placing piece designated as a fixed position on which the dummy substrate is placed during substrate processing, and a substrate placing piece designated as a priority position on which the dummy substrate is preferentially placed when the shortage is filled with the dummy substrate.

According to further other aspect of the present invention, there is provided a substrate transfer method using a dummy substrate, performed by a substrate processing apparatus that transfers a substrate including the dummy substrate and a product substrate into a process chamber, and processes a prescribed number of the substrate collectively in the process chamber, wherein the substrate is transferred using any one of following transfer systems of the dummy substrate, such as:

a product substrate forward placing system in which the product substrate is placed from a head of substrate placing pieces which are provided in the process chamber and a shortage is filled with the dummy substrate;

a product substrate backward placing system in which the product substrate is placed from a rear of the substrate placing pieces and the shortage is filled with the dummy substrate; and an arbitrary indication system in which an arbitrary substrate placing piece is designated so that the dummy substrate is placed thereon.

Preferably, the dummy substrate is placed on the substrate placing piece designated as a fixed position on which the dummy substrate is placed every time substrate processing is performed, and a filler dummy substrate for filling a shortage of the product substrate is placed on the substrate placing piece designated as a priority position on which the dummy substrate is preferentially placed when a shortage is filled with the dummy substrate.

What is claimed is:

1. A substrate processing apparatus, comprising:
   a memory unit that stores at least:
      a production list in which an attribute showing at least a transfer order and a processing status of a plurality of substrates are defined, and
      a plurality of fallback operation tables which are provided in each place where an error is generated and in which a processing content is defined according to the processing status, and
   a control unit that performs control to transfer a substrate of the plurality of substrates into a chamber, wherein when the error is detected during the transfer of the substrate, the control unit performs control to:
      specify the place where the error was generated;
      select the fallback operation table according to the place where the error was generated, from the plurality of fallback operation tables;
      re-create the production list for a fallback operation based on the selected fallback operation table so that the place where the error was generated is disconnected and the transfer of at least some of the plurality of substrates is continued: and
      transfer the substrate based on the re-created production list for the fallback operation.

2. A non-transitory computer-readable recording medium storing a fallback operation program that causes the control unit of the substrate processing apparatus according to claim 1 to perform, the following steps, when the error is detected during a transfer of a prescribed number of substrates:
   specify the place where the error was generated;
   select the fallback operation table according to the place where the error was generated from the plurality of fallback operation tables,
   re-create the production list for a fallback operation based on the selected fallback operation table so that the place where the error was generated is disconnected and the transfer of at least some of the plurality of substrates is continued; and
   transfer the substrate based on the re-created production list for the fallback operation.

3. The substrate processing apparatus of claim 1, wherein the substrate processing apparatus further comprises: a plurality of process chambers, and
when an error was generated in the process chamber during a transfer of a prescribed number of the plurality of substrates into the process chamber, the control unit performs control to:
   make the substrate in the process chamber where the error was generated, stay in this process chamber based on the processing content defined in the fallback operation table,
   re-create the production list to transfer the prescribed number of substrates including another substrate scheduled to be transferred into the process chamber where the error was generated, into another process chamber where the error was not generated; and
   transfer the substrate into the another process chamber where the error was not generated based on the re-created production list.

4. The substrate processing apparatus of claim 1, wherein the substrate processing apparatus further comprises a plurality of preload chambers and a process chamber, and
when an error was generated in a preload chamber of the plurality of the preload chambers during a transfer of a prescribed number of the plurality of substrates into the process chamber through the preload chamber, the control unit performs control to:
   make the substrate in the preload chamber where the error was generated, stay in this preload chamber based on the processing content defined in the fallback operation table;
   re-create the production list to transfer the prescribed number of the plurality of substrates including another substrate scheduled to be transferred into the process chamber, into the process chamber through another preload chamber where the error was not generated of the plurality of preload chambers; and
   transfer the substrate into the process chamber through the another preload chamber where the error was not generated based on the re-created production list.

5. The substrate processing apparatus of claim 1, wherein the substrate processing apparatus further comprises a preload chamber, a process chamber and a transfer chamber, and
when an error is generated in any one of open/close valves connecting the process chamber and the preload chamber to the transfer chamber during a transfer of a prescribed number of the plurality of substrates into the process chamber under a reduced pressure, the control unit performs control to:
   make the substrate at least in the process chamber or the transfer chamber, stay in the process chamber or the transfer chamber;
   increase a pressure at least in the process chamber or the transfer chamber to a prescribed pressure value, based on the processing content defined in the fallback operation table;
   re-create the production list to withdraw the substrate from the process chamber or the transfer chamber where the pressure reaches the prescribed pressure value; and transfer the substrate based on the re-created production list.

6. The substrate processing apparatus of claim 1, wherein the substrate processing apparatus further comprises a plurality of preload chambers and a process chamber, and when error is generated in an open/close valve of one of the plurality of preload chambers during a transfer of a prescribed number of the substrate into the process chamber, the control unit performs control to:
  make the substrate in the preload chamber where the error was generated, stay in the preload chamber where the error was generated based on the processing content defined in the fallback operation table
  re-create the production list to transfer a prescribed number of the plurality of substrates including another substrate scheduled to be transferred into the process chamber, into the process chamber through another preload chamber where the error was not generated of the plurality of preload chambers; and
  transfer the substrate based on the re-created production list.

7. The substrate processing apparatus of claim 1, wherein the substrate processing apparatus further comprises a process chamber, and
the apparatus further comprises another control unit that performs control to collectively process a prescribed number of the plurality of substrates in the process chamber.

8. The substrate processing apparatus of claim 1, wherein the plurality of substrates includes a plurality of product substrates and a plurality of dummy substrates,
the substrate processing apparatus further comprises a process chamber,
the process chamber comprises a plurality of substrate placing parts for placing the substrate thereon, and
the control unit performs control to:
  re-create the production list based on the processing content defined in the fallback operation table, to transfer the dummy substrate based on a parameter for a dummy substrate in which a transfer system of the dummy substrate is set, out of any one of the following systems:
  a product substrate forward placing system in which: (i) the product substrate is placed from a head of substrate placing pieces which are provided in the process chamber, and (ii) a shortage is filled with the dummy substrate;
  a product substrate backward placing system in which: (i) the product substrate is placed from a rear of the substrate placing pieces, and (ii) the shortage is filled with the dummy substrate;
  an arbitrary indication system in which an arbitrary substrate placing piece is designated so that the dummy substrate is placed thereon, and
  set the number of the substrates containing the product substrate and the dummy substrate to a prescribed number.

9. A substrate processing apparatus comprising a control unit that performs control to transfer a plurality of substrates based on a production list in which an attribute showing at least a transfer order and a processing status of the plurality of substrates is defined, wherein when an error is detected during the transfer of a substrate of the plurality of substrates, the control unit performs control to:
  specify a place where the error was generated;
  select a fallback operation table according to the place where the error was generated from a plurality of fallback operation tables which are provided in each place where the error was generated and in which a processing content is defined according to the processing status;
  re-create the production list for a fallback operation based on the selected fallback operation table so that the place where the error was generated is disconnected and the transfer of at least some of the plurality of substrates is continued; and
  transfer the substrate based on the re-created production list for the fallback operation.

10. The substrate processing apparatus of claim 9, wherein the substrate includes a product substrate and a dummy substrate, and
the control unit performs control to: when the error is generated, based on the fallback operation table according to the place where the error was generated:
  specify the number of product substrates that have not undergone substrate processing yet;
  re-create the production list so that a shortage is filled with a filler dummy substrate to obtain a prescribed number of substrates, when the number of product substrates that have not undergone substrate processing yet does not reach a number required for processing; and
  transfer at least a product substrate and a dummy substrate based on the re-created production list.

11. A non-transitory computer-readable recording medium storing a creation program of a production list executed by a control unit, that is provided in a substrate processing apparatus and that performs control to transfer a prescribed number of substrates into a process chamber based on the production list in which attributes of the substrates are defined for showing at least a transfer order and a processing status of the substrates including a dummy substrate and a product substrate, wherein the creation program causes the control unit to execute the steps of:
  specifying a place where the error was generated;
  selecting a fallback operation table according to the place where the error was generated from a plurality of fallback operation tables, which are provided in each place where the error was generated and in which a processing content is defined according to the processing status;
  re-create the production list for a fallback operation based on the selected fallback operation table so that the place where the error is generated is disconnected and the transfer of at least some of the plurality of substrates is continued; and
  transfer the product substrate and the dummy substrate based on the re-created production list for the fallback operation.

* * * * *